United States Patent
Long et al.

(10) Patent No.: US 10,210,190 B1
(45) Date of Patent: *Feb. 19, 2019

(54) ROLL BACK OF SCALED-OUT DATA

(71) Applicant: Amazon Technologies, Inc., Reno, NV (US)

(72) Inventors: Brian Gregory Long, Seattle, WA (US); Justin Thomas Pfifer, Seattle, WA (US); Sunjae Chong, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,446

(22) Filed: Sep. 16, 2013

(51) Int. Cl.
 *G06F 17/30* (2006.01)
(52) U.S. Cl.
 CPC .............................. *G06F 17/30321* (2013.01)
(58) Field of Classification Search
 CPC ........... G06F 17/3002; G06F 17/30312; G06F 17/30575; G06F 17/30088; G06F 17/30598; G06F 17/30613; G06F 17/30946; G06F 17/30321
 USPC ............... 707/695, 696, 741, 684, 711, 737; 709/201; 714/48, 100
 See application file for complete search history.

(56) References Cited

U.S. PATENT DOCUMENTS

| | | | | |
|---|---|---|---|---|
| 6,295,534 | B1* | 9/2001 | Mann | G06F 7/785 707/707 |
| 7,257,690 | B1* | 8/2007 | Baird | G06F 11/1471 707/999.202 |
| 7,725,470 | B2* | 5/2010 | Richards | G06F 17/30979 707/737 |
| 8,510,538 | B1* | 8/2013 | Malewicz | G06F 7/38 712/225 |
| 8,838,534 | B2* | 9/2014 | Fowler | G06F 9/466 707/615 |
| 9,471,610 | B1* | 10/2016 | Long | G06F 17/30 707/707 |
| 2003/0065652 | A1* | 4/2003 | Spacey | G06F 17/30622 707/707 |
| 2007/0050182 | A1 | 3/2007 | Sneddon et al. | |
| 2007/0143688 | A1* | 6/2007 | Cheng | G06F 17/2229 715/738 |
| 2008/0033910 | A1 | 2/2008 | Richards et al. | |

(Continued)

*Primary Examiner* — Alexandria Y Bromell
(74) *Attorney, Agent, or Firm* — Davis Wright Tremaine LLP

(57) ABSTRACT

A computing resource monitoring service detects an issue with processing of metrics data. The metrics data is stored in observation journals within an observation journal logical data container. A computing resource service provider may configure a map reduce processor to select a prior version of an index file, the index file comprising a mapping of the metrics data stored within a metric store and a manifest comprising a listing of all processed observation journals. The map reduce processor may identify newly unprocessed observation journals and process these journals in order to generate new data objects and a new version of an index. Subsequently, an index pointer may be modified such that obsolete versions of the index are removed and the map reduce processor refers to a different version of the index file in order to support future roll back of metrics data.

21 Claims, 16 Drawing Sheets

(56) References Cited

U.S. PATENT DOCUMENTS

| | | | |
|---|---|---|---|
| 2008/0162585 A1* | 7/2008 | Takahashi | G06F 17/30336 707/707 |
| 2009/0271412 A1* | 10/2009 | Lacapra | G06F 17/30206 707/707 |
| 2010/0179959 A1* | 7/2010 | Shoens | G06F 17/30088 707/758 |
| 2010/0257198 A1* | 10/2010 | Cohen | G06F 17/30463 707/770 |
| 2011/0066894 A1* | 3/2011 | Berlyant | G06F 9/5066 714/38.1 |
| 2011/0238716 A1* | 9/2011 | Amir | G06F 3/0611 707/823 |
| 2011/0258482 A1* | 10/2011 | Nightingale | G06F 11/1662 714/4.1 |
| 2012/0066228 A1 | 3/2012 | Charboneau et al. | |
| 2012/0101991 A1* | 4/2012 | Srivas | G06F 17/30194 707/623 |
| 2013/0024412 A1* | 1/2013 | Gong | G06N 5/00 706/46 |
| 2013/0117273 A1* | 5/2013 | Lee | G06F 17/30312 707/741 |
| 2013/0318129 A1* | 11/2013 | Vingralek | G06F 17/30292 707/803 |
| 2014/0052732 A1 | 2/2014 | Softky | |
| 2014/0188840 A1* | 7/2014 | Agarwal | G06F 17/30321 707/711 |
| 2014/0279838 A1* | 9/2014 | Tsirogiannis | G06F 17/30292 707/603 |
| 2014/0279855 A1* | 9/2014 | Tan | G06F 17/30345 707/609 |
| 2014/0281746 A1* | 9/2014 | Ercegovac | G06F 11/0727 714/48 |
| 2015/0039651 A1* | 2/2015 | Kinsely | G06F 17/30563 707/779 |
| 2016/0011935 A1* | 1/2016 | Luby | G06F 3/0617 714/6.2 |

* cited by examiner

Index Build For 7/2/2013 – 14 Day Expiration

| Metric ID | Earliest Start Time | | Latest End Time | | | |
|---|---|---|---|---|---|---|
| | Segment Start Time | Segment End Time | Data Object | Offset | Length |
| Metric G | 6/17/2013 09:00:00 | | 6/20/2013 00:00:00 | | | |
| | 6/17/2013 00:00:00 | 6/20/2013 00:00:00 | D0C1 | 0 | 51200 |
| | 6/18/2013 10:00:00 | 6/21/2013 00:00:00 | D1C1 | 0 | 51200 |
| Metric H | 6/19/2013 00:00:00 | | 6/20/2013 00:00:00 | | | |
| | 6/19/2013 00:00:00 | 6/20/2013 00:00:00 | D0C2 | 51200 | 51200 |
| | 6/20/2013 00:00:00 | 6/21/2013 00:00:00 | D1C2 | 51200 | 51200 |
| Metric J | | | 6/12/2013 18:00:00 | | | |
| | 6/12/2013 02:00:00 | 6/12/2013 18:00:00 | D0C2 | 124000 | 4440 |
| | 6/13/2013 02:00:00 | 6/13/2013 18:00:00 | D1C1 | 124000 | 4440 |
| Metric K | | | 6/20/2013 00:00:00 | | | |
| | 6/12/2013 02:00:00 | 6/20/2013 00:00:00 | D0C1 | 128440 | 51200 |
| | 6/13/2013 22:00:00 | 6/21/2013 00:00:00 | D1C2 | 128440 | 51200 |

FIG. 12

ROLL BACK OF SCALED-OUT DATA

CROSS REFERENCE TO RELATED APPLICATIONS

This application is subject matter related to U.S. patent application Ser. No. 14/028,407, filed concurrently herewith, entitled "SCALE-OUT OF DATA THAT SUPPORTS ROLL BACK," the content of which is incorporated by reference herein in its entirety.

BACKGROUND

Computing resource monitoring systems have evolved and continue to evolve to keep up with the demands of the organizations that use them. Many organizations, for example, utilize computing resource monitoring systems for, among other reasons, evaluating one or more metrics associated with resources and applications that the organizations may utilize to support their businesses. Despite their many advantages, many modern computing resource monitoring systems are prone to data corruption or defects resulting in potential data loss. For example, if data undergoes an irreversible transformation and the transformed data includes one or more defects, it may be difficult or impossible to reverse the process. Currently, many modern computing resource monitoring systems utilize a horizontal partition to store one or more metrics that, if lost, may result in any metrics that reside within the partition being unavailable for all reads and writes at any point in time. Additionally, these modern computing resource monitoring systems may be configured to modify or delete older data objects as new data is introduced. This, in turn, could exacerbate the damage resulting from data corruption or defective transformation of data. Adequately addressing these issues, such as through provisioning additional resources to adequately provide data redundancy in the event of data corruption or irreversible defective transformation, presents additional costs to the organizations that rely on the metric monitoring systems and the computing resource service provider that may provide the metric monitoring systems to its customers.

BRIEF DESCRIPTION OF THE DRAWINGS

Various embodiments in accordance with the present disclosure will be described with reference to the drawings, in which:

FIG. 12 shows an illustrative example of removing one or more expired segments from an index in accordance with at least one embodiment;

DETAILED DESCRIPTION

Figure 1:
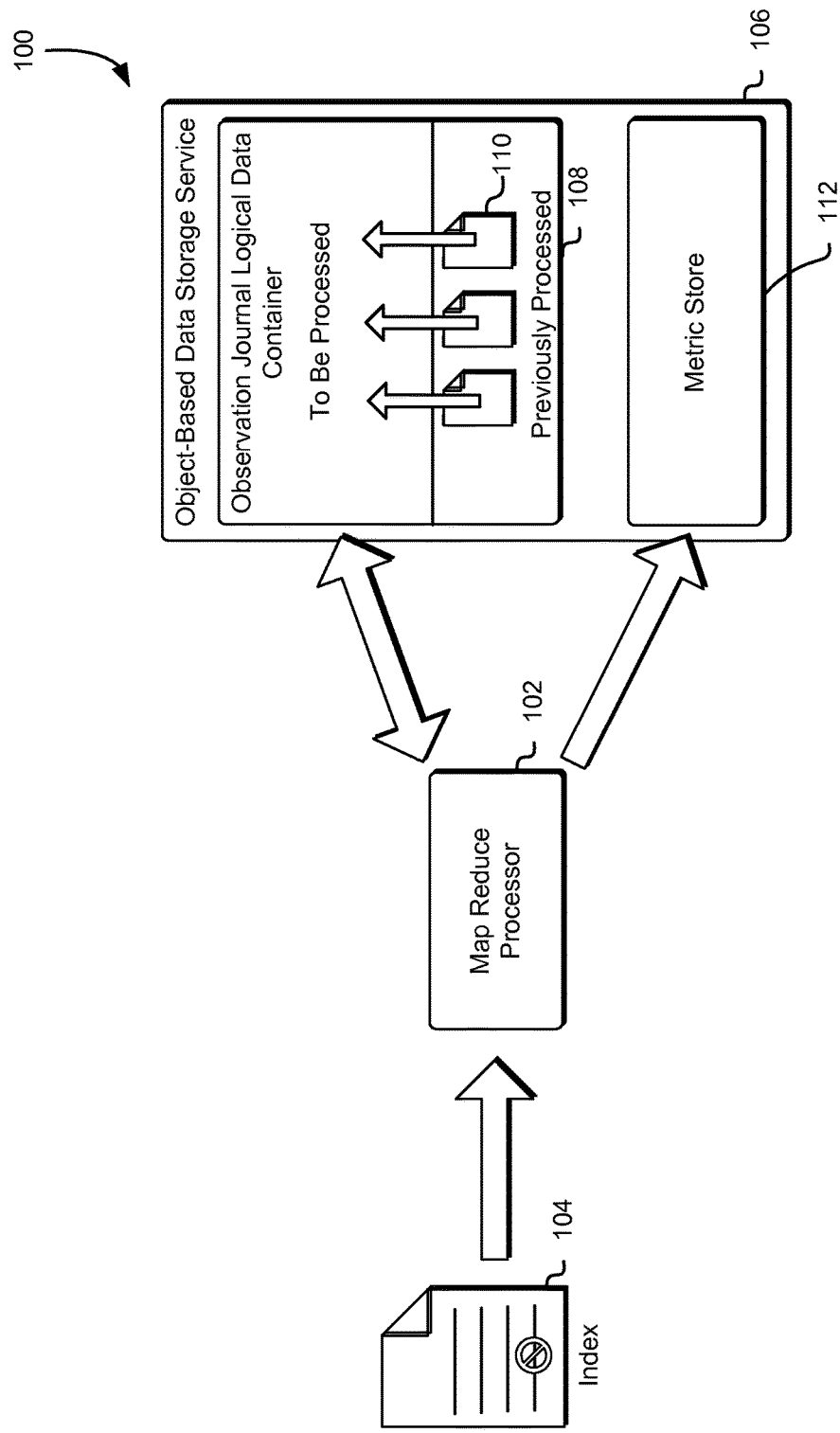
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the replay of a map reduce process to compute and store data metrics in an object-based data storage system. In an embodiment, an entity (e.g., an organization) may communicate with a computing resource monitoring service, such as through appropriately configured application programming interface (API) calls to the service, to request one or more metrics data pertaining to computing resources or customer applications provided to the customer by a computing resource service provider, such as, but not limited to, memory allocation, processor allocation and network performance. The entity may be a customer of a computing resource service provider that operates various services such as data storage services, virtual computer system services and/or computing resource monitoring services. The metrics data may be persistently stored in one or more data objects within a metrics store within an object-based data storage service operated by the computing resource service provider. Accordingly, a customer may be able to interact with a metric store reader, which may be configured to access the data object and obtain the desired metrics data for a particular resource or application that the customer may be using, making the data available for the customer.

In various embodiments, a datastore writer may be configured to receive observation metrics data from one or more monitored clients. These clients may be configured by the computing resource service provider to support and operate the variety of computing resources and applications that may be made available to one or more customers of the computing resource service provider. Accordingly, these clients may also be configured to track and record metrics data. A datastore writer may be configured to obtain this metrics data and write the metrics data to one or more logs. These logs (e.g., observation journals) may be subsequently stored in an observation journal logical data container within an object-based data storage system.

In various embodiments, the computing resource monitoring service may comprise a distributed processing engine (e.g., map reduce processor) for ordering and aggregating metrics data from one or more observation journals. The map reduce processor, also referred to as a distributed processing engine, may be a computer system configured to coordinate processing of data collectively by a plurality of distributed computing nodes of the system in accordance with one or more distributed programming models for processing data sets, such as Map-Reduce. For instance, the map reduce processor may be configured to access the observation journal logical data container to access one or more observation journals which may comprise metrics data. Accordingly, the map reduce processor may separate and order the metrics data according to the metric and observation time. Subsequently, the map reduce processor may aggregate the metrics data into one or more data segments based on the metric identification and an observation time interval. For example, the map reduce processor may aggregate metrics data based on one or more metrics observed over a ten minute interval. Once the metrics data has been aggregated into the one or more segments, the segments may be written to one or more data objects and stored in an object-based data storage service for future customer access. While Map-Reduce is used for the purpose of illustration, other distributed computing models may be used and, when the data sets to be processed so allow, various techniques of the present disclosure may be adapted for systems that do not utilize distributed processing.

In an embodiment, the map reduce processor may be configured to emit a series of index artifacts that may comprise mappings based at least in part on the observation time range for a metric, the name of the data object in which data associated with a metric is stored, and the offset and length of the data associated with a metric within the data object. These index artifacts may be used to populate an index, which may be used to locate and provision metrics data from the object-based data storage service. Thus, the index may enable a customer to submit a query to the computing resource monitoring service to obtain any metrics data currently stored within one or more data objects in the object-based data storage service. The index may comprise a plurality of partitions, each partition comprising data associated with a metric. The index and its constituent partitions may be stored within an object-based data storage use for customer consumption. When a customer submits a query to a metric store reader for certain metrics data, the metric store reader, which may be configured to access the index to obtain and read a database file within each index partition from the object-based data storage service, may determine and locate the metrics data segments required to satisfy the query.

The map reduce processor may be configured to produce a compiled index. For instance, when one or more observation journals are processed and the metrics data extracted from the observation journals has been ordered, aggregated and stored in one or more data objects, the map reduce processor may merge the newly generated index artifacts, as well as the previous version of the index, to create a new compiled index. This new compiled index and its constituent partitions may be uploaded to an object-based data storage system. Subsequently, the metric store reader may be configured to access this new version of the index for processing any customer metrics data queries. The compiled index may be configured to only allow appending of new index artifacts such that any prior data within the partitions in the index is not purged. Accordingly, the metric store reader may continue to utilize a prior version of the index until it is necessary to access the newly compiled index.

In an embodiment, the computing resource monitoring service may be configured with the ability to roll back to a previous version of the index and replay the map reduce process. For instance, a computing resource service provider may configure a map reduce processor within a computing resource monitoring service to process a prior version of the index. The prior version of the index may not include references to the corrupted or defective data since this data may have been generated after the creation of this prior version of the index. Accordingly, the prior version of the index may additionally not refer to previously processed observation journals that may have been processed after the creation of this version of the index. As a result, the map reduce processor, configured to process any observation journals that have not been processed, may process the previously processed observation journals that are not included in the prior version of the index.

The map reduce processor may be configured to once again separate, order, aggregate and store the metrics data included in these newly unprocessed observation journals and produce a new set of index artifacts. These index artifacts may then be merged with the prior version of the index and its associated partitions to form a compiled index that may include one or more segments that may correspond to metrics data and the data objects that include the metrics data. Since the data objects and indices utilize an "append-only" model, the corrupted or defective data may remain stored within the object-based data storage service. However, the new index may not refer to any segments comprising corrupted data, thus preventing inadvertent access to this data. Accordingly, the map reduce processor may modify an index pointer such that future operations within the computing resource monitoring service refer to this new version of the index.

In an embodiment, the computing resource monitoring service may be configured to fulfill queries for metrics data during a replay process. As noted above, the map reduce processor may be configured to utilize a prior version of the index and accordingly process any newly unprocessed observation journals. However, a metric store reader, configured to obtain metrics data persistently stored in the object-based data storage service, may be configured to refer to an index pointer to obtain a current version of the index to locate the metrics data. Since the object-based data storage service may comprise various versions of the index and an index pointer that may include a revision history of the indices, the metric store reader may continue to refer to a current version of the index while the map reduce processor performs the replay process based at least in part on a prior version of the index. Accordingly, the metric store reader may be able to provide the entity that submitted the query with metrics data pertaining to a current version of index at the same time the map reduce processor is performing the replay process.

In this manner, the computing resource monitoring service may be configured to interact with an object-based data storage service to persistently store metrics data, make the data available to customers of the computing resource service provider. In addition, the techniques described and suggested herein facilitate additional technical advantages. For example, because, in some embodiments, the computing resource service provider may configure the map reduce processor to roll back to a prior version of the index such that the computing resource monitoring service and its corresponding components may replay certain metrics data aggregation processes, the computing resource monitoring service may be able to mitigate issues resulting from corrupted or defective metrics data generated during the initial processing of the observation journals. This, in turn, may reduce the cost of any downtime, particularly for a customer that is in need of reviewing metrics data for a host of resources or applications the customer may be utilizing at any given point in time. Additional uses are also enabled by the various techniques described herein.

FIG. 1 shows an illustrative example of an environment 100 in which various embodiments may be practiced. In the environment 100, a map reduce processor 102 may be configured to process one or more observation journals in order to extract and compile metrics data for subsequent customer reference and use. The map reduce processor 102 may be configured to operate at different time intervals. For instance, the map reduce processor 102 may be configured to operate daily, processing any unprocessed observation journals that may have become available since the prior processing activity. In order to determine which observation journals have been processed and which have not been processed, the map reduce processor 102 may be configured to refer to a manifest which may be updated based on the observation journals previously processed by the map reduce processor 102. Accordingly, any observation journals that do not appear on the manifest may be processed by the map reduce processor 102. This manifest may be persistently stored in an index 104 which the map reduce processor 102 may be configured to access in order to process the observation journals.

Accordingly, as illustrated in FIG. 1, the environment 100 includes an index 104. The index may include a mapping of the various metrics data stored within the object-based data storage service 106. The index 104 may include one or more partitions, each partition corresponding to a metric that is tracked by the various applications and/or computing resources provided by a computing resource service provider. These partitions may be created to specify which data objects are currently being used to persistently store certain metrics data. The index 104 may be used by a metric store reader to satisfy a customer query for metrics data. For instance, a customer may submit a query (such as through one or more appropriately configured API calls to the service) to the metric store reader that includes a metric identification and a particular timestamp or range of time that the customer is interested in. Accordingly, the metric store reader may be configured to refer to the index 104 to locate the partition associated with the requested metric. Subsequently, the metric store reader may be configured to use the partition to locate data objects within the object-based data storage service 106 that may include the requested metrics data. The metric store reader may be configured to make this metrics data available for customer reference and use.

The map reduce processor 102 may also serve to transmit one or more executable instructions to the object-based data storage service 106 such that, when executed by the object-based data storage service, causes the object-based data storage service to remove any metrics data that has expired. For instance, the computing resource monitoring service may be configured to retain certain metric data for a limited amount of time, after which the expired metrics data is purged from the one or more data objects. In an embodiment, the map reduce processor 102 may be configured to modify the index 104 such that any expired metrics data information within the partitions included in the index 104 is also purged. This may serve to reduce the size of the index 104 and reduce the amount of metrics data stored within the object-based data storage service 106. The computing resource monitoring service may be configured to maintain one or more indices 104 to provide the ability to roll back to a previous version of the index 104. For instance, a computing resource service provider may configure the map reduce processor 102 to cause the map reduce processor to use a previous version of the index 104 in the event that an operation issue impacts the metrics data.

The index 104 may be created after the map reduce processor 102 has processed one or more observation journals and has extracted the metrics data from these observation journals. The map reduce processor 102 may be configured to subsequently obtain the previous version of the index 104, and its constituent partitions, and merge it with new index artifacts to create a newly compiled index. This new searchable index 104 may be stored within the object-based data storage service 106 for reference. Subsequently, the computing resource monitoring service may be configured to modify an index pointer such that a metric store reader may be configured to refer to this newly created index and fulfill customer queries for certain metrics data.

The computing resource service provider may configure the map reduce processor 102 to refer to a prior version of the index 104. For example, the computing resource service provider may configure the map reduce processor 102 to refer to a prior version of the index 104 if an operation issue arises that impacts customer metrics data. This act may impact the manifest the map reduce processor 102 is configured to refer to such that previously processed observation journals may not appear in the manifest. Accordingly, the map reduce processor 102 may be configured to interact with an observation journal logical data container 108 within the object-based data storage service 106 to obtain one or more previously processed observation journals 110 for processing. These previously processed observation journals 110, based on the prior version of the index 104 being utilized, may no longer be considered to be "previously processed" as the manifest may not list these observation journals 110 as having been processed.

Accordingly, the map reduce processor 102 may be configured to discover and process these observation journals 110 while filtering out any observation journals that have been previously processed and are listed in the manifest. The map reduce processor 102 may be configured to extract the metrics data from the observation journals 110, sort and subsequently aggregate the metrics data based on the metrics data timestamps. This metrics data may be stored as one or more segments within one or more data objects for storage. Accordingly, the environment 100 may include a metric store 112 for storing the data objects comprising the metrics data segments.

As a side effect of the map reduce processor 102 extracting and storing the metrics data in a metric store 112, the map reduce processor 102 may generate one or more index artifacts. These artifacts may include mappings of the metric time range, name of the data object that includes the metrics data segments and the offset and length of the metrics data within the data object. The map reduce processor 102 may be configured to merge these index artifacts with the index 104 currently being referenced. Since the index 104 is based on an "append-only" model, no data within the index file 104 may be deleted or overwritten. Rather, the data in the index artifacts may be added to the index 104 and its constituent partitions and the prior version of the index is stored to provide the ability to roll back to a previous version of the index. This new compiled index may thus be published to a metric store reader. The metric store reader may be configured to consult the newly compiled index to determine which data objects stored within the metric store 112 comprise the metrics data necessary to satisfy a customer query.

Figure 2:
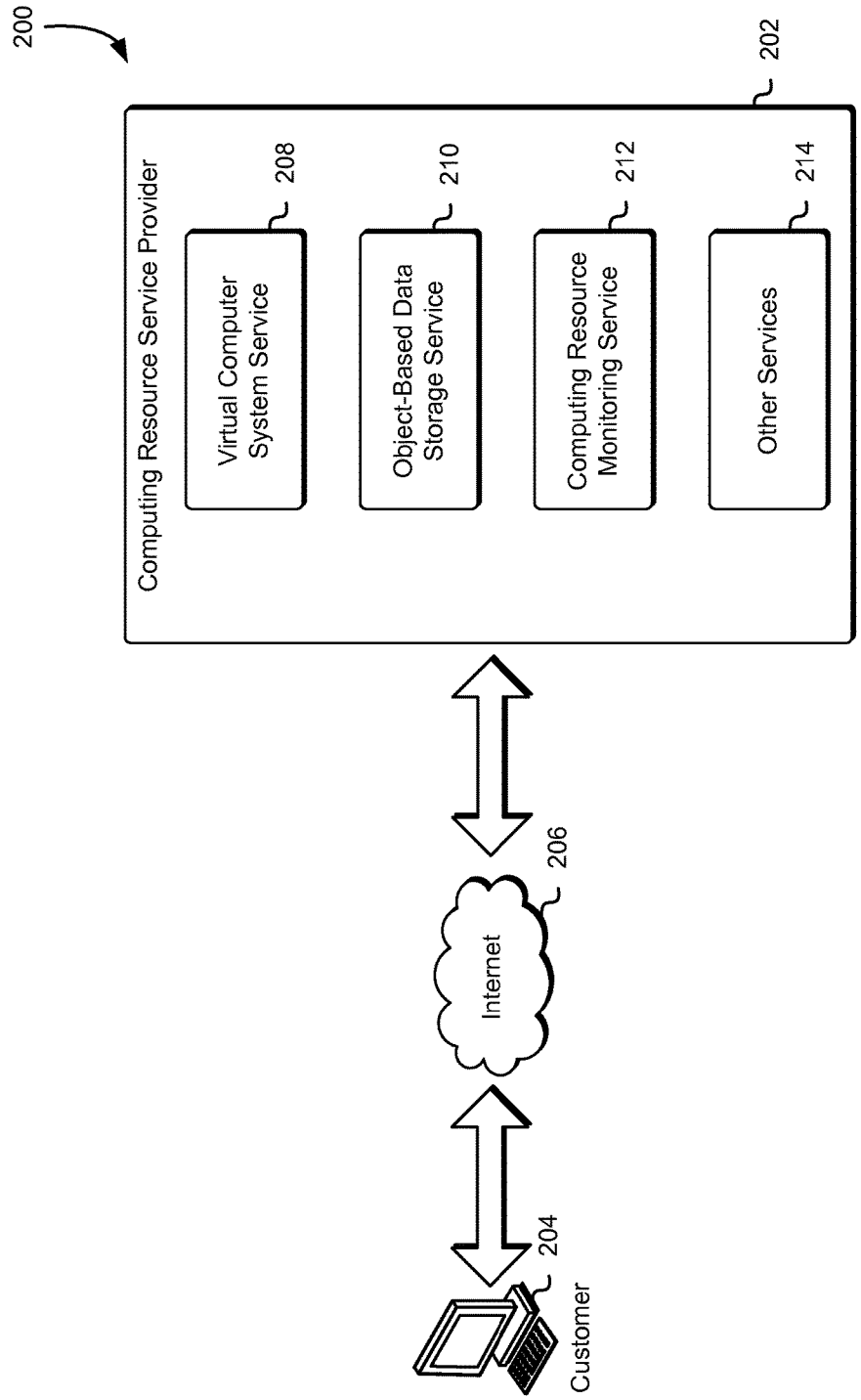
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to operate and support one or more database applications or services for its own customers. Additionally, the customer 204 may be an individual that could utilize the various services to persistently store information generated in performing a task. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least three types of services. The services provided by the computing resource service provider, in this example, include a virtual computer system service 208, an object-based data storage service 210, a computing resource monitoring service 212 and one or more other services 214, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

The object-based data storage service 210 may comprise a collection of computing resources that collectively operate to store data for a customer 204. The data stored in the object-based data storage service 210 may be organized into data objects. The data objects may have arbitrary sizes except, perhaps, for certain constraints on size. Thus, the object-based data storage service 210 may store numerous data objects of varying sizes. The object-based data storage service 210 may operate as a key value store that associates data objects with identifiers of the data objects which may be used by the customer 204 to retrieve or perform other operations in connection with the data objects stored by the data storage service 210. Access to the data storage service may be through appropriately configured API calls.

Figure 4:
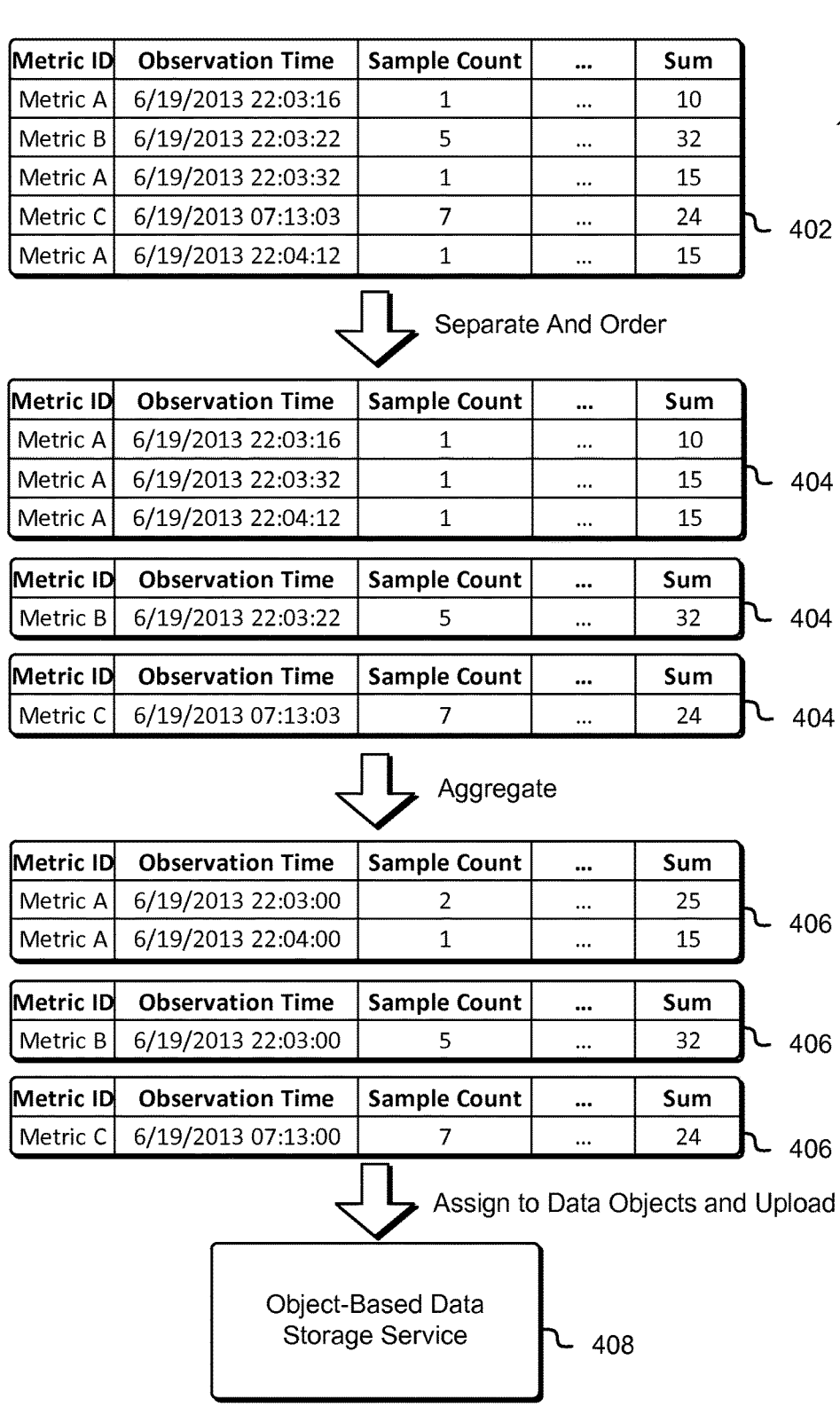
FIG. 4 shows an illustrative example of a map reduce process in accordance with at least one embodiment.

As will be described in greater detail in connection with FIG. 4, the object-based data storage service 210 may be used to persistently store one or more local log files in a plurality of observation journal logical data containers. These local log files may be updated and uploaded to the observation journal logical data container at intervals specified by the operator of the computing resource service provider 202 or the customer 204. The contents of an observation journal logical data container may have no particular arrangement such that any log file may comprise any metric with observations against any period of time.

Additionally, the object-based data storage service 210 may comprise a metric store for the storage of pre-computed metric statistics. The data for a given metric may be persistently stored and arranged contiguously in a data object such that it may be read in a single streaming request from a customer 204. Each data object configured to store these metrics may be additionally configured to have a specified storage capacity. Thus, when a data object has reached the specified storage capacity, newly created metrics data files may be stored in a new data object. The object-based data storage service 210 may also persistently store one or more indices which may be used by a metric store reader to locate and make available metrics data in order to fulfill a customer query. The metric store reader may be configured to obtain an index history file stored within the object-based data storage service 210 in order to select a current version of the index and its corresponding partitions.

The computing resource monitoring service 212 may comprise a plurality of computing resource components collectively configured to provide long-term and persistent retention of metrics data. Accordingly, the computing resource monitoring service 212 may include a map reduce processor that may be configured to interface with the object-based data storage service 210 to retrieve any unprocessed observation journals from an observation journal logical data container and to subsequently store aggregated metrics data in data objects that may be stored within the object-based data storage service 210. The map reduce processor may be configured to additionally generate one or more index artifacts which may be used to create an index and its constituent partitions or to merger with an existing index and its constituent partitions.

Additionally, the computing resource monitoring service 212 may comprise a metric store reader which may be a computer system or component thereof configured to refer to an index. As noted above, a customer may interact with the computing resource monitoring service 212 to query certain metrics data for reference and use. Accordingly, the metric store reader may be configured to refer to the index to locate and make available the queried metrics data. In this fashion, the computing resource monitoring service 212 may fulfill a customer query for metrics data.

The computing resource monitoring service 212 may serve to roll back to a previous version of an index file in order to re-process one or more observation journals. For instance, the computing resource service provider 202 may determine that there is an operational issue with the metrics data currently stored. For example, an automated process may detect the operational issue or a human operator may notice the issue. Accordingly, the computing resource service provider 202 may, pursuant to operator input, access the computing resource monitoring service 212 to configure a map reduce processor to refer to an earlier version of the index file. Accordingly, the map reduce processor may utilize the earlier version of the index file to re-process one or more observation journals and generate a new set of data objects and index artifacts for use by the computing resource monitoring service 212. This process may result in a new version of the index file that refers to this new set of data objects and may now be used to fulfill customer queries. The computing resource monitoring service 212 may be configured to modify an index pointer subsequent to the roll back process in order to cause the various components that comprise the computing resource monitoring service to refer to this new index.

The computing resource service provider 202 may additionally maintain one or more other services 214 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, block-level data storage services, object-level archival data storage services, services that manage other services and/or other services.

Figure 3:
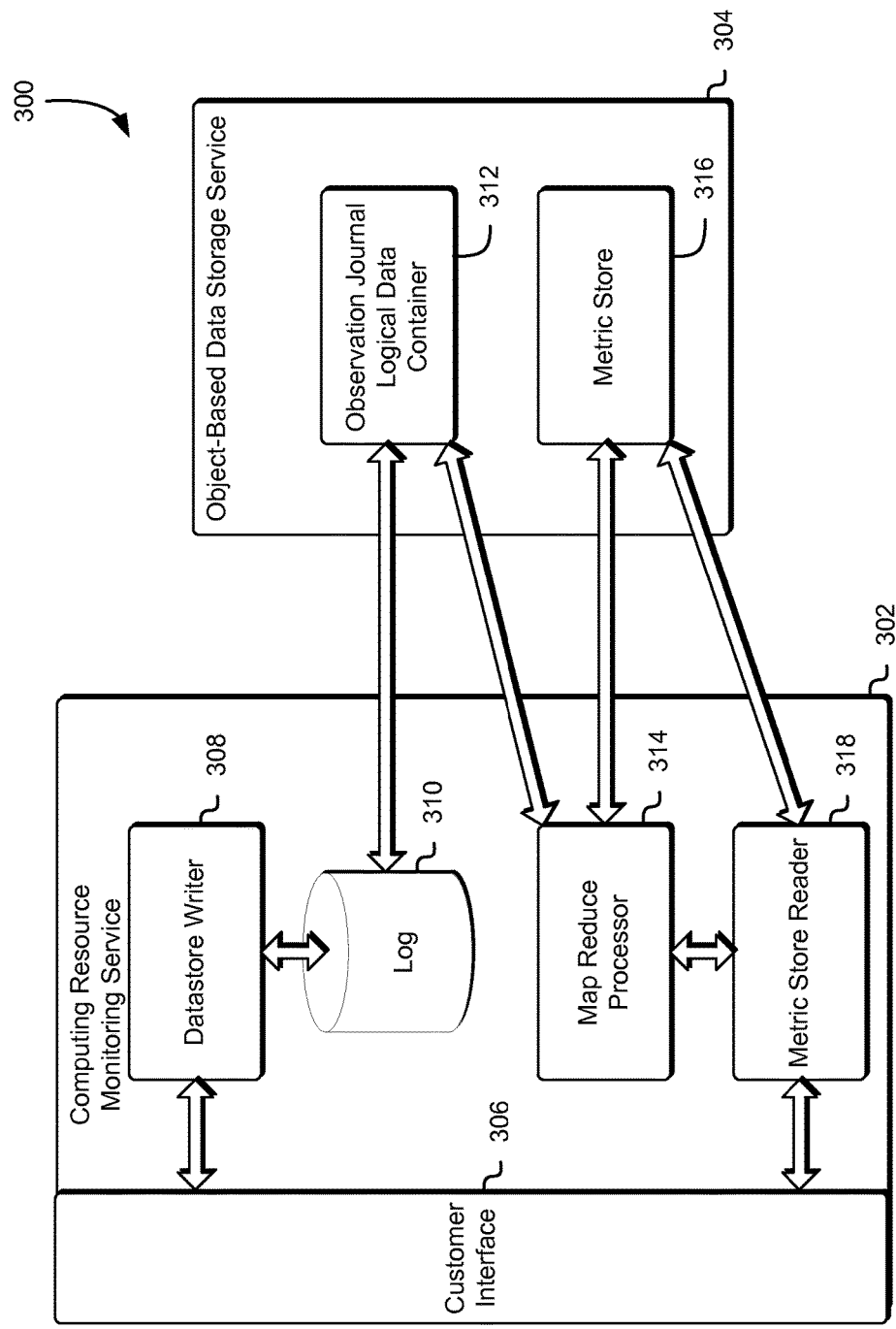
FIG. 3 shows an illustrative example of an environment in which various embodiments can be implemented.

As noted above, the computing resource service provider may maintain a computing resource monitoring service and an object-based data storage service to support customer operations. The computing resource monitoring service and the object-based data storage service may comprise a plurality of components that, when configured to operate together, may be used to persistently store metrics data and roll back to previous metrics data if an operation issue impacts customer metrics data. Accordingly, FIG. 3 is an illustrative example of an environment 300 illustrating the various components that comprise these services in accordance with at least one embodiment. In the environment 300, a computing resource monitoring service 302 may be configured to interact with an object-based data storage service 304 to, among other things, persistently store one or more observation journals for obtaining metrics data and persistently store aggregated metrics data in one or more data objects. The computing resource monitoring service 302 may provide a customer with a customer interface 306 to access the computing resource monitoring service 302. A customer may utilize the customer interface 306 through one or more communications networks, such as the Internet. The customer interface 306 may contain certain security safeguards to ensure that the customer has authorization to access the computing resource monitoring service 302. For instance, in order to access the computing resource monitoring service 302, a customer may need to provide a username and a corresponding password or encryption key when using the customer interface 306. Additionally, requests (e.g., API calls) submitted to the customer interface 306 may require an electronic signature generated using a cryptographic key such that the electronic signature is verifiable by the computing resource monitoring service 302, such as by an authorization system (not shown).

The customer may utilize the customer interface 306 to customize the type of data that may be produced in tracking one or more metrics statistics. For example, a customer may specify, through the customer interface 306, that it is preferable to track the central processing unit (CPU) utilization for a given application that the customer is currently using to support the customer's business. Accordingly, the customer interface 306 may be configured to transmit this request to a datastore writer 308. The datastore writer 308 may be configured to obtain metrics data from all the various applications and computing resources provided by a computing resource service provider. Additionally, the datastore writer 308 may be configured to track metrics data according to customer requests, such as those received through a customer interface 306. The datastore writer 308 may be configured to spool all metrics data into local logs 310.

The logs 310 generated by the datastore writer 308 may be rotated and uploaded to an observation journal logical data container 312 within an object-based data storage service 304. The computing resource service provider may configure the computing resource monitoring service 302 to upload these logs 310 to the observation journal logical data container 312 at certain time intervals or after a certain trigger. For instance, each log 310 may comprise a given storage capacity such that metrics data may be written to a log until there is no remaining storage capacity. Accordingly, when the log 310 has been filled, it may be automatically stored within the observation journal logical data container 312. Alternatively, the logs 310 may be configured to continue to receive metrics data until a certain amount of time has passed. Once the amount of time has passed, the log 310 may be transferred and stored in the observation journal logical data container 312.

The logs 310 stored in the observation journal logical data container 312 may have no particular metric arrangement; any log 310 may comprise any metrics data with the time the metrics data was observed. For instance, as noted above, if the computing resource service provider has configured the computing resource monitoring service 302 to continuously write metrics data to a log 310 until the log is full, the log may comprise metrics data spanning a wide time range. Alternatively, if logs 310 are stored in the observation journal logical data container 312 after a certain time interval, the logs may only comprise metrics data obtained over that time period.

The computing resource monitoring service 302 may comprise a map reduce processor 314 that may be configured to perform one or more actions utilizing the logs (e.g., observation journals) stored within the observation journal logical data container 312. The map reduce processor 314 may be configured to operate at certain time intervals specified by the computing resource service provider to support the computing resource monitoring service 302. For instance, the map reduce processor 314 may be configured to operate once per day. However, the time intervals and operations per time intervals are customizable and any such variations are to be considered within the scope of the present disclosure.

Figure 13:
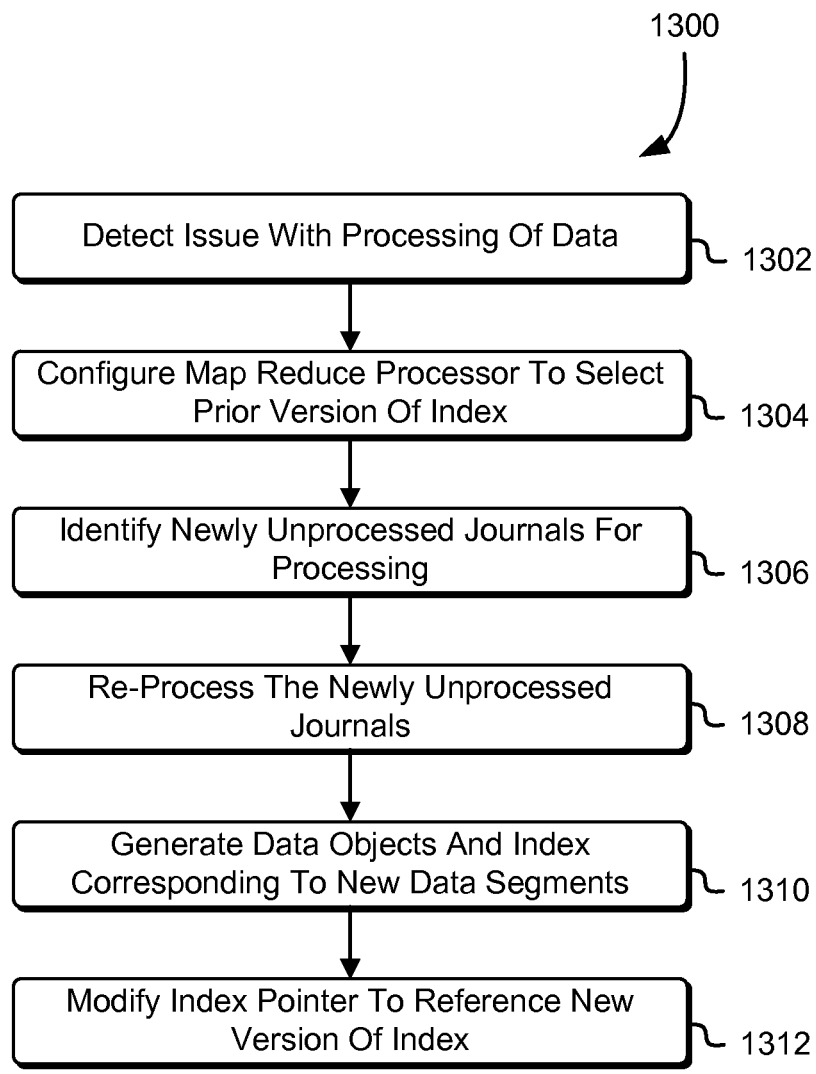
FIG. 13 shows an illustrative example of a process for replaying a map reduce process based on detection of an issue with processing of metrics data in accordance with at least one embodiment.

As will be described in greater detail in FIG. 13, the map reduce processor 314 may be configured to obtain any unprocessed observation journals from the observation journal logical data container 312 while filtering out any observation journals that may have been processed previously. Subsequently, the map reduce processor 314, configured to process these observation journals, may separate and order the metrics data extracted from the observation journals. For instance, the map reduce processor 314 may be configured to separate and order the data based on the metric identification of each metric. Accordingly, this ordered metrics data may be aggregated and stored in one or more data objects which may be transferred and stored in a metric store 316. The metric store 316 may comprise various data objects that comprise metrics data over a certain period of time. As will be described in greater detail in connection with FIG. 12, the data objects may be stored within the metric store 316 for a period of time, after which the data objects may be purged automatically. This may serve to provide storage capacity for newly created data objects.

The metric store 316 may also be configured to persistently store one or more versions of an index. The index may serve to identify where metrics data is stored within the metric store 316. Additionally, the index may include a manifest which may be of use to the map reduce processor 314. The index may include one or more partitions. These partitions may include mappings for each metric within the metric store 316. Each partition may correspond to a metric such that the partition may include a listing of all locations and segments that comprise the metric data. As noted above, the map reduce processor 314 may be configured to only process observation journals that have yet to be processed. In order to distinguish these observation journals from previously processed observation journals, the map reduce processor 314 may be configured to obtain the current version of the index from the metric store 316 and refer to the manifest to identify the observation journals that are to be processed.

In order to keep track of which data objects comprise certain metrics data, the map reduce processor 314 may also be configured to produce one or more index artifacts. These index artifacts may comprise mappings from metric time range to the name of the data object and the offset and length of the data segment for a metric stored within. Accordingly, the map reduce processor 314 may be configured to merge these index artifacts with the current version of the index, as noted above, to produce a new version of the index. This new version of the index, and its constituent partitions, may be subsequently stored within the metric store 316. As will be described in greater detail below, this process may be an "append-only" process such that the new version of the index includes all the metrics data from the previous iterations and the new metrics data.

Once the new version of the index and its constituent partitions have been created, the computing resource monitoring service 302 may be configured to modify an index pointer causing the various components comprising the computing resource monitoring service 302 to refer to this new version of the index. The metric store reader 318 may be configured to satisfy customer read requests, such as those submitted through a customer interface 306. Accordingly, the metric store reader 318 may be configured to refer to the index pointer in order to select the current version of the index as created by the map reduce processor 314 to determine which data objects comprise the data necessary to satisfy the customer request. The metric store reader 318 may thus be configured to obtain the necessary data objects and make the metrics data available to the customer through the customer interface 306.

As noted above, the map reduce processor may be configured to distill metrics data from one or more unprocessed observation journals and store aggregated metrics data in one or more data objects. Accordingly, FIG. 4 shows a diagram 400 example of a map reduce process in accordance with at least one embodiment. As noted above, the observation journals may include one or more metrics data obtained through a datastore writer. The datastore writer may obtain metrics data continuously from one or more applications and computing resources. Thus, the datastore writer may continue to fill an observation journal 402 until it has reached its storage capacity, without performing any ordering operations.

The map reduce processor may be configured to process an observation journal 402 and separate and order the metrics data into one or more ordered data segments 404. Each ordered data segment 404 may comprise observations for a given metric identification. For instance, as illustrated in FIG. 4, each ordered data segment 404 may comprise all observations for Metric A, Metric B or Metric C from the processed observation journal 402. Additionally, the map reduce processor may sort the metrics data within the ordered data segment 404 by any category. For instance, the metrics data may be sorted by the observation time. While observation times are used extensively throughout the present disclosure for the purpose of illustration, other variables may be used to sort metrics data within an ordered data segment 404. For instance, metrics data may be further sorted by the sample count, sum and any other category specified by the computing resource service provider or the customer.

Once the metrics data has been separated and ordered into one or more ordered data segments 404, the map reduce processor may be configured to aggregate this metrics data into aggregated data segments 406. The map reduce processor may be configured to aggregate the metrics data based on the observation time for each metric observation. For instance, in this illustrative example, the map reduce processor may aggregate all metrics data observed at one minute intervals. Thus, two Metric A observations observed within a one minute interval may be aggregated into one aggregated data segment 406. Again, while observation times are used extensively throughout the present disclosure for the purpose of illustration, other variables may be used to determine aggregation of metrics data. The map reduce processor may be configured to assign these aggregated data segments to one or more data objects and upload these objects into an object-based data storage service 408. As noted above, the map reduce processor may be configured to simultaneously produce one or more index artifacts to map the locations of the metrics data within the object-based data storage service 408.

Figure 5:
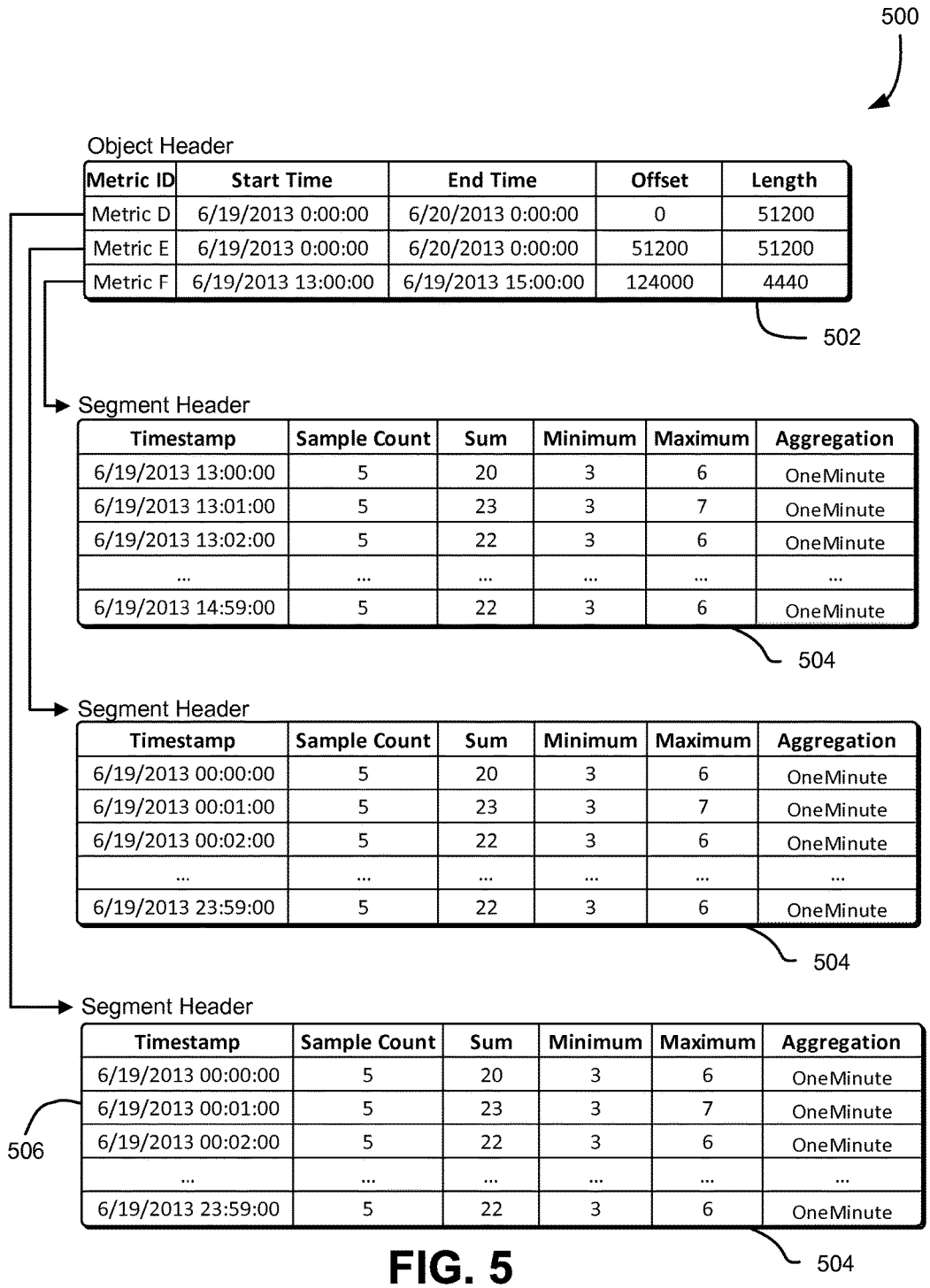
FIG. 5 shows an illustrative example of a data object storage format that may be used for storing metrics data in a data object in accordance with at least one embodiment.

As noted above each data object may comprise metrics data that has been sorted, ordered and aggregated by a map reduce processor. Accordingly, FIG. 5 is a diagram 500 illustrating an example of a data object storage format that may be used for storing metrics data in a data object in accordance with at least one embodiment. In order to support the index mapping process, each data object 502 may comprise a header which may be used to inspect a data object and determine the components stored therein.

Each metric data segment 504 stored within the data object 502 may additionally comprise its own segment header to further allow index mapping for finding metrics data. The segment header may include one or more features of the metric identification in order to simplify the mapping process. For instance, a data segment 504 that comprises Metric D data may include a segment header that includes a Metric D identifier or key. A computing resource service provider may thus be able to create a unique method of naming these segments to support index mapping. Accordingly, when a customer submits a query for certain metrics data over a certain time range, the metric store reader may be configured to refer to the index to locate the data object 502 and the associated data segment 504 to find all observations 506 that may satisfy the customer query.

Figure 6:
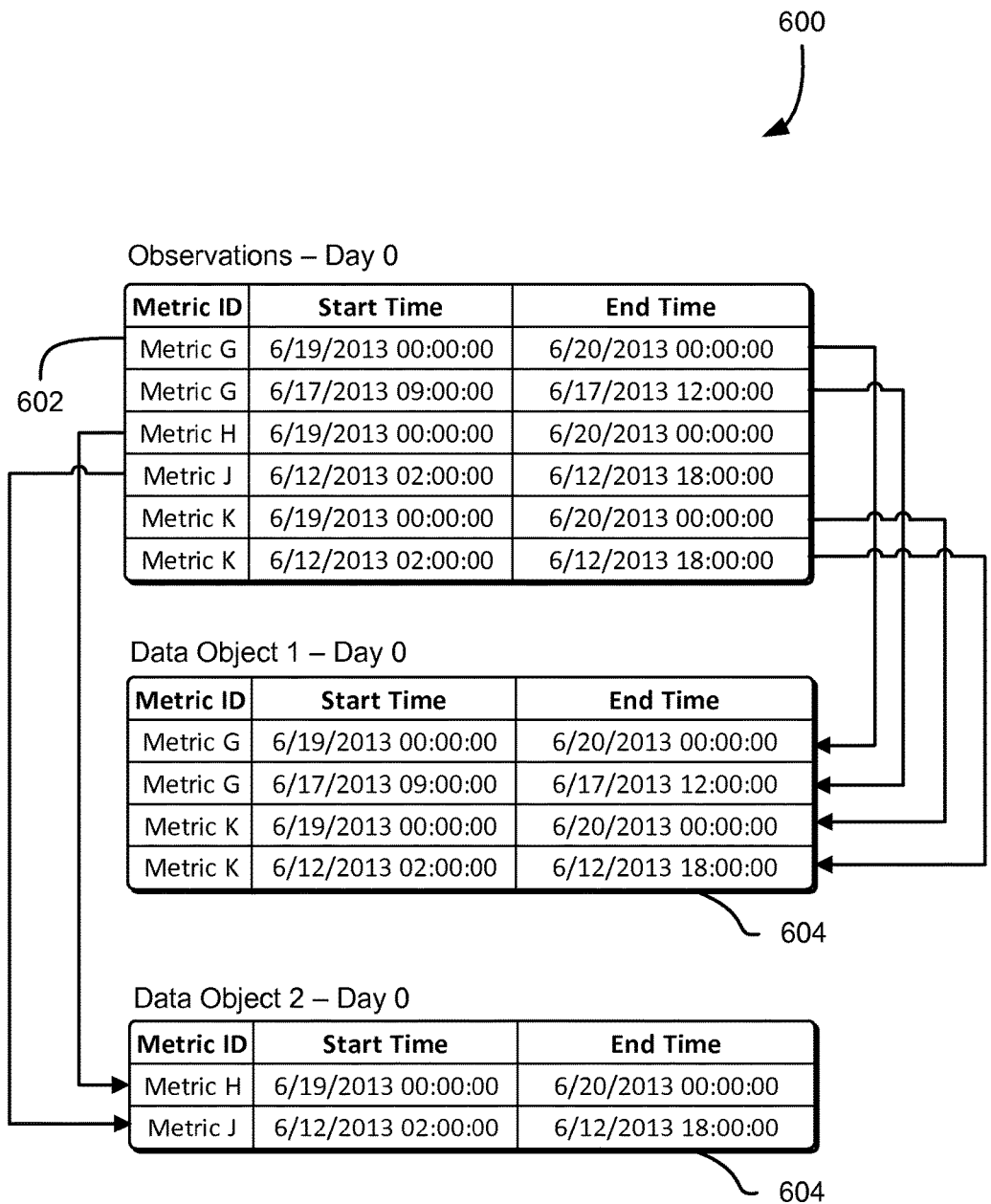
FIG. 6 shows an illustrative example of storing metrics data in one or more data objects for a given time interval in accordance with at least one embodiment.

FIG. 6 shows a diagram illustrating an example of storing metrics data in one or more data objects for a given time interval in accordance with at least one embodiment. As noted above, the map reduce processor may be configured to obtain an observation journal to extract metrics data and aggregate this metrics data for storage in one or more data objects. Accordingly, the diagram 600 shows an observation journal 602 that may comprise one or more metrics data (e.g., observations). In this illustrative example, the metrics data may be separated, ordered and aggregated such that the metrics data may be organized based on one or more schema. For instance, in this example, the metrics data is organized based on the metric identification.

Once the metrics data has been aggregated, the map reduce processor may be configured to transfer the aggregated metrics data to one or more data objects 604 for storage. As noted above, when metrics data is stored in a data object 604, the map reduce processor, configured to generate index artifacts to support processing of customer queries for metrics data, may generate these index artifacts and prepare these artifacts for merger with a current version of the index and its constituent partitions. Thus, the index artifacts and, subsequently, the compiled index, may comprise mappings for each of the observations stored within the data objects 604.

As noted above, the map reduce processor may be configured to process any unprocessed observation journals stored in an observation journal logical data container over certain time intervals. For instance, for the purpose of illustration, the map reduce processor may be configured to obtain unprocessed observation journals daily. However, while the use of a daily cycle for performing these operations is used for the purpose of illustration, the scope of the present disclosure is not so limited. For instance, the computing resource service provider may configure the map reduce processor to operate at different time intervals or as a result of one or more triggers, such as the creation of a number of observation journals, etc.

Figure 7:
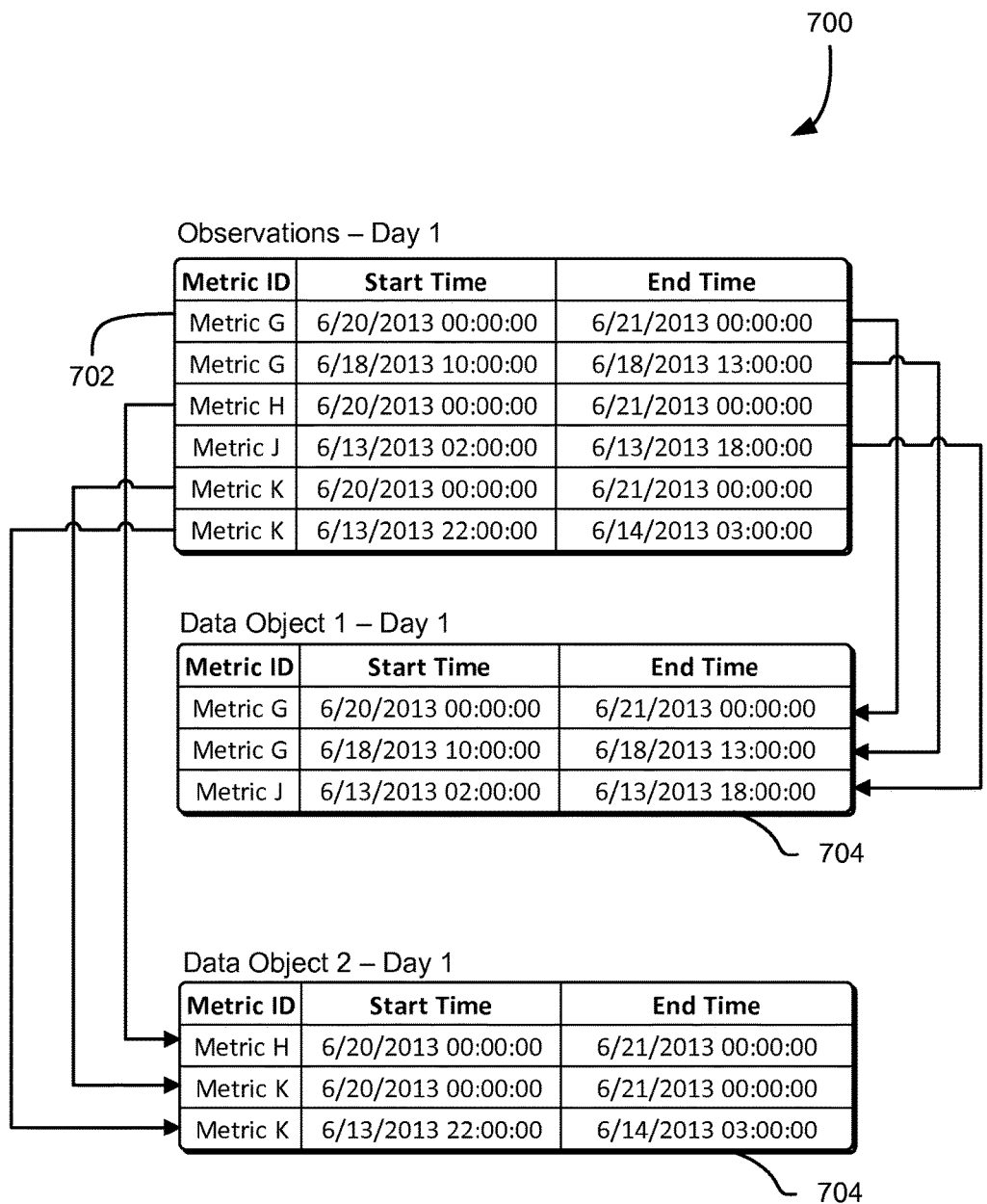
FIG. 7 shows an illustrative example of storing metrics data in one or more data objects for a given time interval subsequent to a prior time interval in accordance with at least one embodiment.

Accordingly, FIG. 7 shows an illustrative example of storing metrics data in one or more data objects for a given time interval subsequent to a prior time interval in accordance with at least one embodiment. The diagram 700 is similar to the environment illustrated in FIG. 6 in that it includes an observation journal 702 that may comprise one or more observations for processing. Accordingly, the map reduce processor may be configured to separate, order and aggregate the observations based on one or more criteria, such as metric identification.

Once again, when the metrics data has been aggregated, the map reduce processor may be configured to assign each of the metrics data segments to one or more data objects 704. However, as illustrated in both FIGS. 6 and 7, the metrics data may not necessarily be assigned to the same data object 704 as in a prior set of operations. Accordingly, there may be no guarantee or requirement that the metrics data be assigned to the same data object 704 as the same type of metrics data processed in a prior set of operations. Additionally, this new metrics data may be stored in new data objects 704 associated with the current set of operations. For instance, as illustrated in FIG. 7, the metrics data may be stored in data objects 704 associated with the day the map reduce processor has aggregated the new data. In an embodiment, the computing resource monitoring service may include a defragmentation processor which may be configured to examine the partitions within an index to locate metrics data scattered in a variety of data objects and subsequently move said metrics data to individual data objects based on the type of metrics data.

Figure 8:
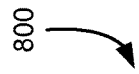
FIG. 8 shows an illustrative example of an index file for storing one or more segments in accordance with at least one embodiment.

As noted above, the map reduce processor may be configured to create an index that includes one or more partitions. These partitions may include mappings to the metrics data stored within one or more data objects in order to support customer queries for metrics data. Accordingly, FIG. 8 shows an illustrative example of an index 800 for storing one or more segments in accordance with at least one embodiment. The index 800 and its constituent partitions may be written to allow keying the particular metrics data stored within a metric store based to one or more criteria. For instance, the index 800 may be keyed by metric identification and by date ranges to allow a metric store reader to locate the matching data segments necessary to fulfill a customer query. Accordingly, the first layer 802 of the index 800 may include the one or more criteria which may be used to allow the index 800 to quickly reject any queries that do not have any matching metrics data.

The index 800 may additionally include a second layer, or sub-index, that may comprise the metrics data segments 804 that comprise the data associated with the metric. The sub-index may be used to map these data segments 804 based on one or more criteria included in each metrics data segment 804. For instance, in this illustrative example, the sub-index may include mappings for the metrics data segments 804 based on the time ranges included within each metrics data segment 804. While time ranges are used within this illustrative example for the purpose of illustration, the scope of the present disclosure is not so limited. For instance, the sub-index mappings may be based upon other criteria, such as data segment length, data object name or the data segment offset.

When a customer query is submitted to the metric store reader, such as through an appropriately configured API call to the service through a customer interface, the metric store reader, configured to examine an index to locate metrics data, may locate the metrics data based on one or more criteria used to generate the mappings in the index. Accordingly, the metric store reader, once it has located the metrics data, may refer to the sub-index to locate the data segments necessary to fulfill the criteria that may be included in the customer request. Thus, the metric store reader may be configured to utilize the index to locate and make available the metrics data that will fulfill the customer query.

Figure 9:
FIG. 9 shows an illustrative example of generating an index artifact using metrics data in accordance with at least one embodiment.

In order to generate an initial index or an updated version of the index based upon the latest metrics data stored within one or more data objects in a metric store, the map reduce processor may be configured to generate one or more index artifacts based upon the observation journals processed over the course of an operations cycle. Accordingly, FIG. 9 shows a diagram 900 illustrating an example of generating an index artifact using metrics data in accordance with at least one embodiment. In the diagram 900, the map reduce processor may be configured to generate aggregated metrics data segments that are subsequently stored in one or more data objects 902. As noted above, each data object 902 may comprise one or more metrics data segments that include metrics data based on one or more criteria.

In an embodiment, an index artifact 904 may be produced indicating the covered time range and location of each data segment stored within the metric store. For instance, in this particular example, the index artifact 904 may comprise metrics data segments according to a time range for all of the metrics data of a particular type. For instance, Metric G may include two data segments, each spanning a certain amount of time. The index artifact 904 may be written such that it illustrates the entire time range of the Metric G data and the location of these segments within the metric store. However, the index artifact 904 may be written such that the metrics are compiled based on other criteria, such as data object identification/commonality or data segment length.

Figure 10:
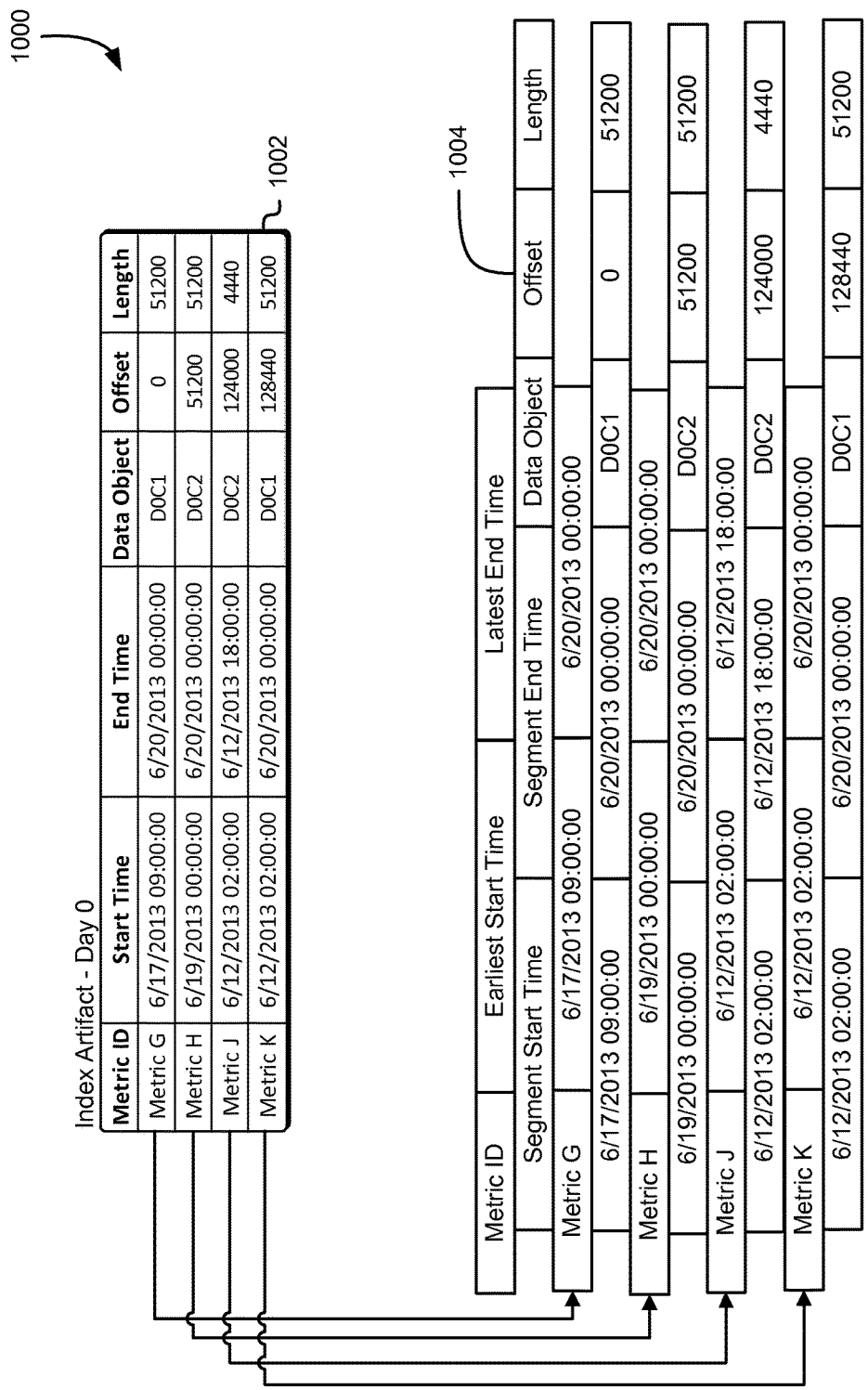
FIG. 10 shows an illustrative example of building an index using an index artifact in accordance with at least one embodiment.

As noted above, these index artifacts may be used to generate an index or produce an updated version of an index for use in locating metrics data within one or more data objects in a metric store, subject to a customer query. Accordingly, FIG. 10 shows a diagram 1000 illustrating an example of building an index using an index artifact in accordance with at least one embodiment. The index build process may occur once the map reduce processor has stored aggregated metrics data in one or more data objects within a datastore and the index artifacts have been generated. Accordingly, the diagram 1000 may include one or more index artifacts 1002 generated based upon one or more observation journals processed over a given time period or triggering event. As noted above, each index artifact 1002 may be organized such that metrics data may be located within the metric store. For instance, the index artifact 1002 may include metrics data locations based on the type of metric.

As illustrated in FIG. 8, an index 1004 may be created with two distinct layers which may be used to support the fulfillment of any customer queries for metrics data. The first layer of the index 1004 may include the metric identification as well as other criteria that may be used to reject any customer queries that do not include any matching metrics data. The second layer, or sub-index, included in the index 1004 may include the metrics data segments that are stored within the metric store. These segments may be obtained from the index artifact 1002, as illustrated in FIG. 10.

Once the data segments have been incorporated from the index artifacts 1002, the completed index 1004 and the constituent partitions that comprise the index 1004 may be persistently stored within the metric store in an object-based data storage service. Accordingly, the map reduce processor may be configured to transmit one or more executable instructions to the metric store reader that, when executed by the metric store reader, may cause the metric store reader to utilize this new index 1004. Alternatively, the metric store reader may be configured to periodically poll the metric store to determine if any new indices have been stored within the metric store since the last poll. If there is a new index, the metric store reader may be configured to obtain this new index to support customer queries for metrics data.

Figure 11:
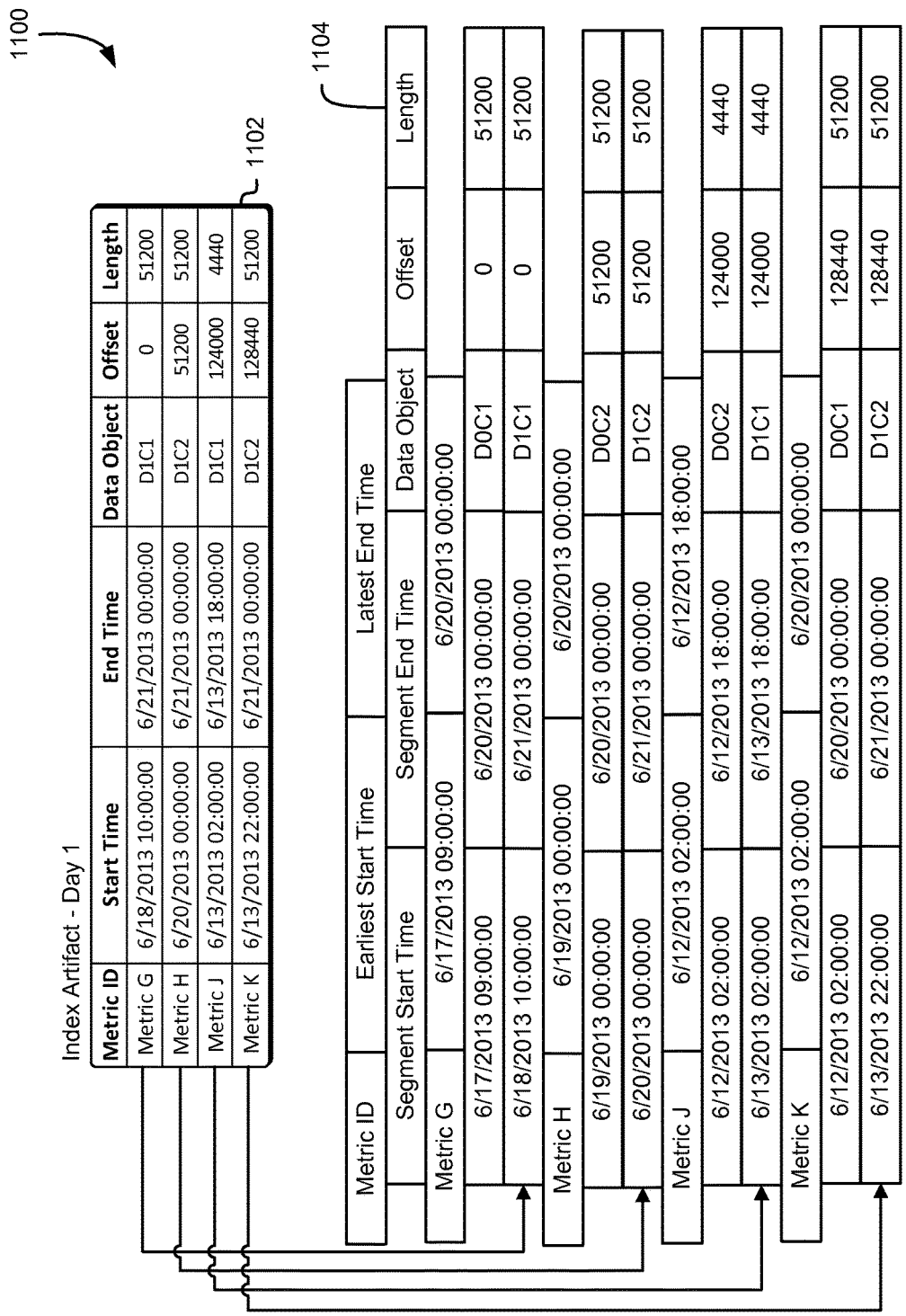
FIG. 11 shows an illustrative example of appending an index using a new index artifact in accordance with at least one embodiment.

As noted above, the map reduce processor may be configured to obtain a current version of the index, along with the generated index artifacts, to create a new version of the index. The index artifacts and the current version of the index may be merged to generate this new version of the index. This new version of the index may be created through an "append-only" process, such that older data segments may not be deleted but rather new segments may be added, or appended, to the partitions that comprise the index. Accordingly, FIG. 11 shows a diagram 1100 illustrating an example of appending an index using a new index artifact in accordance with at least one embodiment. In this illustrative example, the map reduce processor may have generated a new index artifact 1102 during a different set of operations as opposed to the set of operations used to generate the index artifact illustrated in FIG. 10. The map reduce processor may be configured to obtain the current version of the index and merge it with the new index artifact 1102.

The map reduce processor may be configured to append the data segments included in the new index artifact 1102 to the existing data segments included within the index 1104. In the "append-only" process, the index 1104 may be modified such that the first layer of the index may include updated criteria for determining whether a customer query includes data segments stored within the metric store. The second layer, or sub-index, of the index 1104 may be appended to include the new data segments included in the index artifact 1102. In this manner, any data segments within the metric store may be located by a metric store reader configured to process customer queries.

This new version of the index 1104 may be stored within the metric store for use by a metric store reader. Accordingly, as noted above, the map reduce processor may be configured to transmit one or more executable instructions that, when executed by the metric store reader, cause the metric store reader to use this new version of the index 1104 to locate metrics data necessary to fulfill a customer query. The computing resource monitoring service may retain a certain number of indices, including the new version of the index 1104, within a metric store in order to provide the ability to roll back to a previous version of the index and accordingly re-process any observation journals to re-generate metrics data.

While the metric store may be configured to store several versions of the index, the metric store may be configured to purge any indices based on one or more criteria. For instance, the metric store may be configured to purge one or more indices that have been stored longer than a specified period of time. Alternatively, the metric store may be configured to purge one or more indices based upon a triggering event. For example, if the computing resource service provider has determined that a roll back is necessary to re-create metrics data, the map reduce processor may be configured to refer to a prior version of the index in order to process observation journals that may have been previously processed. Accordingly, the map reduce processor may be configured to transmit executable instructions to the metric store to purge any indices currently stored within that were created after the current index in use by the map reduce processor.

In addition to purging any expired or obsolete indices, the map reduce processor may also be configured to purge any expired or obsolete data segments within an index as well. Accordingly, FIG. 12 shows a diagram 1200 illustrating an example of removing one or more expired segments from an index in accordance with at least one embodiment. As noted above, the index 1202 may be created through an "append-only" process such that new data segments may be added to the index as the map reduce processor processes one or more observation journals. However, the index 1202 may become too large if the "append-only" process is permitted to go unfettered. Thus, the map reduce processor may be configured to not only append newly created data segments from the index artifacts to the index file 1202, but also delete data segments based upon one or more criteria. For instance, as illustrated in FIG. 12, the map reduce processor may be configured to remove any expired data segments 1204. In this illustrative example, the map reduce processor may be configured to purge any data segments with a segment start time that exceeds fourteen days. Thus, when the map reduce processor merges the index artifacts with a current version of the index, the map reduce processor may locate and purge these expired data segments.

If all data segments for a particular metric are purged as part of this process, the map reduce processor may be configured to additionally delete the first layer of the index associated with the metric in order to quickly reject any queries that do not have any matching metrics data. Meanwhile, non-expired data segments 1206 may remain unmodified within the index 1202 such that a customer query for such data may be fulfilled. The map reduce processor may be configured to additionally merge any available index artifacts to this index in order to create a new version of the index. It should be noted that, as noted above, the metric store may be used to store multiple versions of the index based upon one or more criteria. Accordingly, if any expired data segments 1206 are deleted from the index 1202, the metric store may still retain a prior version of the index that includes the expired data segments 1206 to support roll back and redundancy.

As noted above, the object-based data storage service may be configured to persistently store one or more different versions of the index to enable roll back of metrics data. Accordingly, FIG. 13 shows an illustrative example of a process 1300 for replaying a map reduce process based on detection of an issue with processing of metrics data in accordance with at least one embodiment. In the process 1300, the computing resource service provider may detect 1302 an issue with the processing of metrics data. For instance, the computing resource service provider may detect that metrics data has been corrupted within one or more data objects stored within an object-based data storage service. Alternatively, the metrics data may be defective as a result of an error in programming the map reduce processor. The computing resource service provider may detect this issue through a number of ways. For instance, the computing resource service provider may receive input regarding an issue from a customer or other operator of the one or more services provided by the computing resource service provider. Alternatively, the computing resource service provider may perform routine inspections of the metrics data stored within the object-based data storage service and detect the issue in this manner. Accordingly, there may be a need to roll back to a previous version of the index to correct the issue.

Once the issue has been detected, the computing resource service provider may configure 1304 the map reduce processor to select a prior version of the index. For instance, the computing resource service provider may modify the programming within the map reduce processor, modify input parameters into the processor, or otherwise configure the processor to enable the processor to select this prior version of the index. As noted above, an index pointer may include a revision history of the index and may comprise a listing of all versions of the index persistently stored within an object-based data storage service. This index pointer, which may be stored within the object-based data storage service, may be used by the metric store reader to identify the current version of the index to use to support a metrics data query. Accordingly, if the index pointer is modified to support the replay process, there may be a gap in coverage as certain metrics data associated with a current version of the index may be unavailable during the replay process. Accordingly, manual configuration of the map reduce processor may enable the metric store reader to continue to obtain metrics data corresponding to a current version of the index to fulfill a metrics data query.

As noted above, the index may include a manifest that may include a listing of the observation journals that have been processed. This may enable a map reduce processor to filter out any observation journals within an observation journal logical container in order to prevent duplication of metrics data segments stored within the metric store. When a prior version of the index is selected, the map reduce processor may also refer to a prior version of the manifest. Accordingly, from the perspective of this prior version of the manifest, previously processed observation journals may not appear in the manifest. Thus, the map reduce processor, configured to process any unprocessed observation journals, may identify 1306 any newly unprocessed journals within the observation journal logical data container that may need to be processed.

Once the map reduce processor has identified 1306 which observation journals require processing, the map reduce processor, configured to process any unprocessed journals, may re-process 1308 these identified observation journals. As illustrated in FIG. 4, the map reduce processor may be configured to separate and order the metrics data in the unprocessed observation journals by metric identification. Additionally, the map reduce processor may be configured to order these metrics based on one or more criteria. Processing of the unprocessed observation journals may also be performed in a number of ways. For instance, the observation journals, which may also be referred to as data sets, may be processed by distributing processing tasks to distributed computing nodes and receiving results from the distributed computing nodes.

Once the map reduce processor has ordered these metrics based on the one or more criteria, the map reduce processor may aggregate the observations from the observation journals into metrics data segments once the metrics data has been extracted and arranged as above. Thus, these metrics data segments may include the re-processed metrics data corresponding to the observation journals not included in the manifest.

As noted above, the map reduce processor may be configured to persistently store the data segments in one or more data objects, which may be stored within a metric store. Additionally, the map reduce processor may be configured to emit (e.g., generate) one or more index artifacts which may include mappings of the location of data corresponding to each recorded metric within the data objects. Accordingly, the process 1300 may include generating 1310 data objects and an index corresponding to the newly created data segments. In order to generate these data objects, the map reduce processor may be configured to write these newly created data segments to one or more data objects, which may be stored within a metric store. Generating these new data objects may also include collecting the results from the distributed computing nodes. Additionally, the map reduce processor may be configured to merge the one or more index artifacts generated during this process with the version of the index currently being used by the map reduce processor to create a new index. This new index may include one or more partitions, wherein each partition may include the location of the data objects comprising metrics data for each metric recorded.

Once the map reduce processor has generated the metrics data segments, stored these segments in one or more data objects and merged the index artifacts with the index to create a new version of the index, the map reduce processor may be configured to modify 1312 the index pointer to reference the new version of the index. As noted above, the map reduce processor may be configured to refer to a prior version (e.g., generation) of the index. Accordingly, if a new index is generated using the index artifacts and this prior version of the index, any indices that were created subsequent to this prior version of the index previously may now be obsolete, as they may be superseded by this newly created index and may comprise corrupted or defective metrics data. Thus, once the replay process is complete, the metric store reader, configured to use the index pointer to identify the current version of the index, may use this newly created index to locate metrics data in order to begin processing the query that may be received. Additionally, if the computing resource service provider opts, at a later time, to initiate another replay process, the revision history may not contain the obsolete indices. The obsolete versions of the index may be removed at a later time, dependent upon one or more criteria set forth by the computing resource service provider. For instance, the computing resource service provider may configure the computing resource monitoring service to purge any indices after a certain time period.

Figure 14:
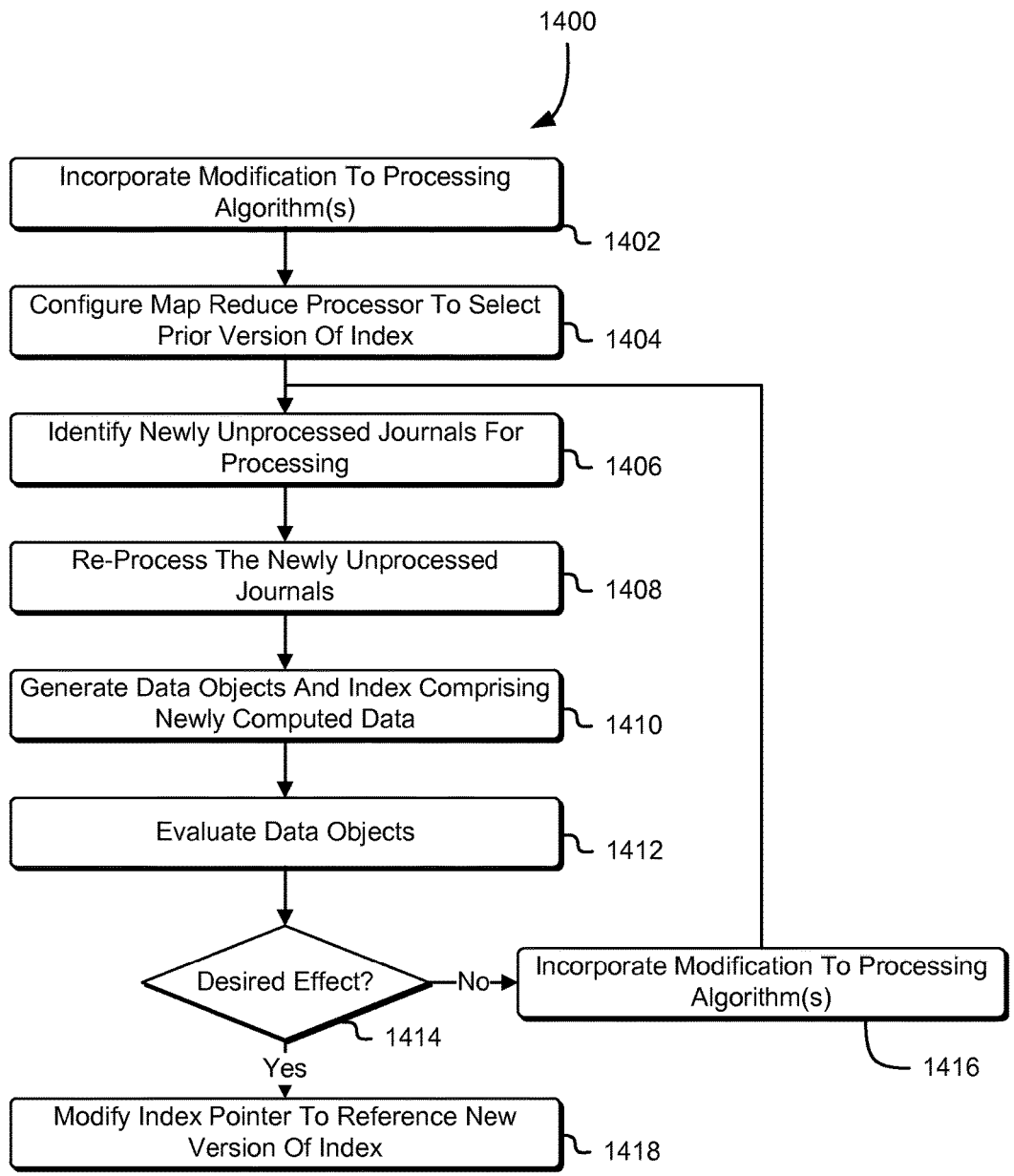
FIG. 14 shows an illustrative example of a process for replaying a map reduce process based on one or more modifications to metrics data processing algorithms in accordance with at least one embodiment.

The computing resource service provider may not necessarily need to detect an issue with the metrics data in order to roll back to a prior version of the index and initiate a replay process. Accordingly, FIG. 14 shows an illustrative example of a process 1400 for replaying a map reduce process based on one or more modifications to metrics data processing algorithms in accordance with at least one embodiment. In the process 1400, a computing resource service provider may decide to incorporate 1402 a modification to one or more processing algorithms included in the map reduce processor. For instance, the computing resource service provider may have developed a set of algorithms that increases the efficiency of the map reduce processor or aggregates the metrics data in a different manner. As such, it may become desirable to re-run the map reduce processor to update the metrics data based on these algorithms. While the use of a new set of algorithms is used extensively in the present disclosure to illustrate the modification of the processing algorithms, the present disclosure is not so limited. For instance, a computing resource service provider may modify the existing processing algorithms by changing the existing algorithms, adding new algorithms to the existing processing algorithms, removing/replacing algorithms, etc. The result of modifying the processing algorithms may result in a reconfiguring of how the distributed processing engine (e.g., map reduce processor) processes the observation journals.

Accordingly, the computing resource service provider may configure 1404 the map reduce processor to select and utilize a prior version of the index. As noted above, it may be undesirable to modify the index pointer to select and utilize this prior version of the index as this may affect any response to queries received during the replay process. Accordingly, the computing resource service provider may manually perform this configuration of the map reduce processor (e.g., through user input of a human operator) while leaving the index pointer intact to support any queries received during the replay process. Additionally, this may enable the map reduce processor to immediately refer to this prior version of the index for further processing.

Once the map reduce processor has been configured to use a prior version of the index, the map reduce processor, configured to process any unprocessed observation journals, may identify 1406 any newly unprocessed journals for processing. As noted above, the prior version of the index currently used to support the replay process may include a manifest. This manifest may include a listing of all observation journals processed in order to obtain the metrics data comprising this version of the index. Thus, any observation journals that may have been processed to generate any subsequent indexes may not be included in this manifest. These previously processed observation journals, accordingly, may be considered newly unprocessed for purposes of the replay process.

With the newly unprocessed journals identified, the map reduce processor may be configured to re-process 1408 the newly unprocessed journals. As noted above, the map reduce processor may be configured to first separate and order the metrics data based on the metric identification. Additionally, the map reduce processor may be configured to further organize this metrics data according to the time in which the metric observation was made. Subsequently, the map reduce process may be configured to aggregate the metrics data into one or more data segments for storage within a metric store.

Accordingly, the map reduce processor may be configured to generate 1410 data objects and a new version of the index comprising the newly computed metrics data. The map reduce processor may be configured to generate one or more index artifacts. These index artifacts may include mappings of the metrics data segments within the data objects stored in the metric store. Subsequently, the map reduce processor, based on its configuration, may merge these index artifacts with the index currently being used to generate a new version of the index. As noted above, the merging process may be an "append only" process such that any metrics data added to the index is added to any existing metrics data stored therein. Additionally, since this new index may be based upon a prior version of the index, the new index may not include metrics data computed using the older algorithms.

Prior to activating this new version of the index for supporting queries and future map reduce processes, the computing resource service provider may opt to evaluate 1412 the data objects. Since the map reduce process may be an "append only" process, the data objects created using an obsolete version of the index may still be stored within the metric store. These now obsolete data objects, which may be based upon the prior version of the index used to generate the new data objects and index, may be located and used to perform the evaluation of the performance of the new algorithms.

Thus, the computing resource service provider may evaluate these data objects to determine 1414 whether the map reduce processor, utilizing the new algorithms, has produced the desired effect. If the re-processing of the newly unprocessed journals and the data objects do not exhibit the desired effect, the computing resource service provider may again incorporate 1416 a modification to the processing algorithms. This further modification of the processing algorithms may be introduced, for example, to attempt to obtain the desired effect or to revert back to the original set of algorithms. The incorporation of additional modifications to the processing algorithms may cause the map reduce processor, configured to process observation journals based on the current manifest provided in the current index, to identify 1406 and process 1408 unprocessed journals and generate new data objects and a corresponding index. Since the map reduce processor may not have been modified further to incorporate the newly generated index in the first iteration, the unprocessed journals may still not be included in the manifest of the prior version of the index selected. Thus, the same unprocessed journals processed during the first iteration may still be identified upon further modifications to the processing algorithms. This may enable the computing resource service provider to continuously modify the processing algorithms without the need to continuously re-configure the map reduce processor past the first iteration.

If the re-processing of the newly unprocessed journals has resulted in data objects and an index that have the desired effect, the computer resource service provider may modify 1418 the index pointer in order to reference the new version of the index. For instance, as noted above, the map reduce processor may be configured to select a prior version of the index. Accordingly, any versions of the index subsequent to this prior version of the index may no longer apply. The computing resource service provider may modify the index pointer to remove any reference to these versions of the index subsequent to this prior version of the index used to generate these new data objects. In addition, the computing resource service provider may modify the index pointer to make the newly created index the latest version of the index for further use by the various components of the computing resource monitoring service (e.g., map reduce processor and metric store reader).

Figure 15:
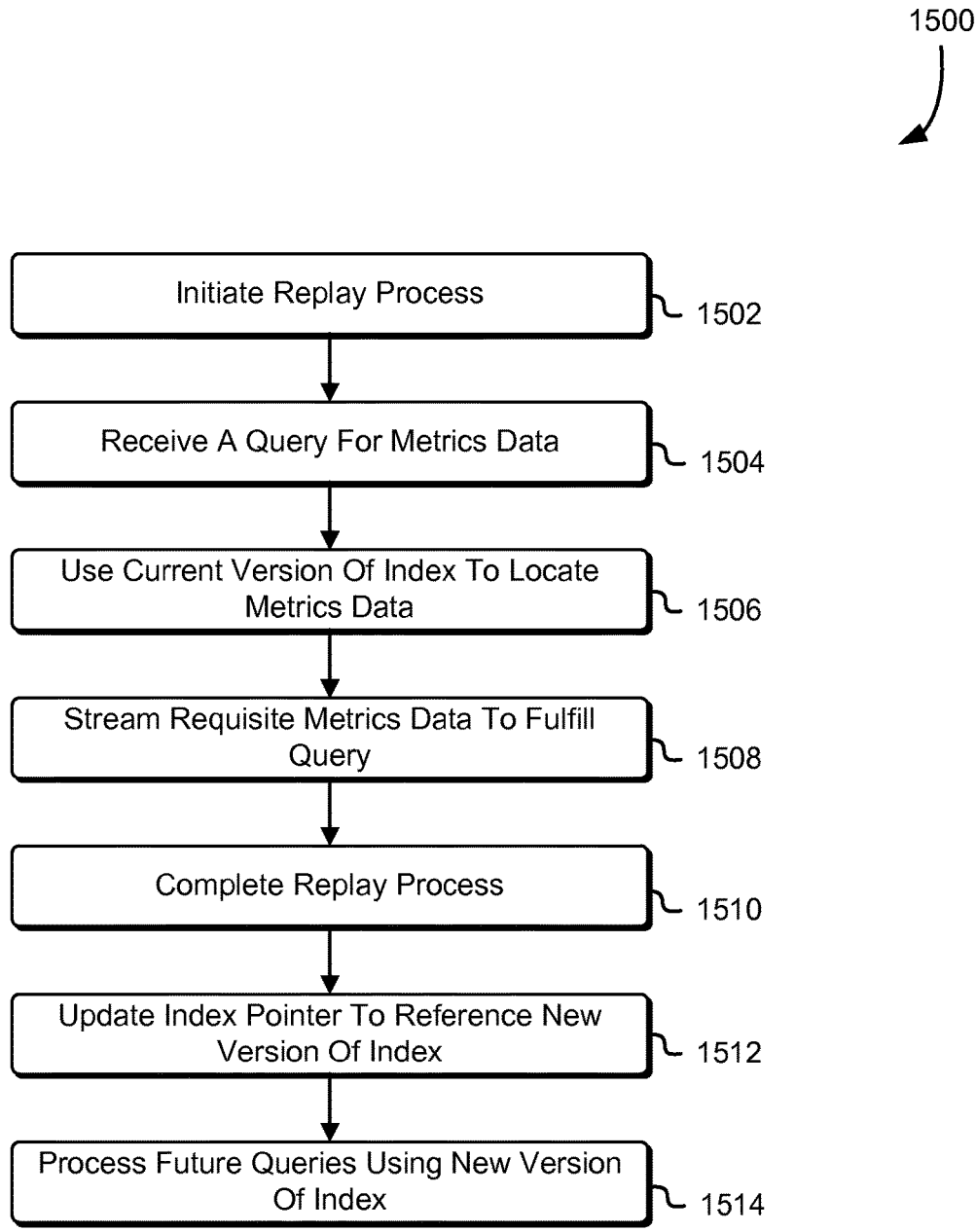
FIG. 15 shows an illustrative example of a process for processing a query for metrics data during a replay operation in accordance with at least one embodiment.

As noted above, the computing resource service provider may perform a replay process in order to address a current issue with metrics data stored in the metric store or in order to incorporate new algorithms to improve metrics data calculation and storage. During this process, the computing resource service provider may opt to allow customer queries to continue such that there is no interruption in service. Accordingly, FIG. 15 shows an illustrative example of a process 1500 for processing a query for metrics data during a replay operation in accordance with at least one embodiment. In the process 1500, a computing resource service provider may initiate 1502 a replay process. As illustrated in FIGS. 13 and 14, the computing resource service provider may configure the map reduce processor to select a prior version of the index. This may result in the map reduce processor utilizing newly unprocessed observation journals to generate new data objects and a new index.

During the replay process, the metric store reader may receive 1504 a customer query for metrics data. The customer query may include a time range for metrics data that may be stored within a metric store in an object-based data storage service. Since the replay process may affect metrics data covering a certain time range, the customer query, as noted above in connection with FIG. 1, may include a request for metrics data affected by the replay process. However, the data objects that include the requested metrics data may be unaffected since the creation of data objects is an "append only" process in that data objects may not be purged or modified until the data objects have expired. While the use of customer queries are used throughout the present disclosure for the purpose of illustration, the scope of the present disclosure is not so limited. For instance, other types of queries may be used to request metrics data, such as queries not generated by a customer but rather by the computing resource service provider or another entity on behalf of the customer.

As noted above, the computing resource service provider may configure the map reduce processor to refer to a prior version of the index and re-process any newly unprocessed observation journals. At the same time, the index pointer may remain unmodified until a later time. Thus, the metric store reader, configured to refer to a current version of the index pointer to identify a current version of the index, may use 1506 a current version of the index to locate the queried metrics data. The current version of the index may include the location of data objects that comprise the queried metrics data. Regardless of whether the replay process results in a new version of the index that does not include references to these data objects or not, the metric store reader may still be able to locate these data objects.

Once the metric store reader has located the data objects that comprise the queried metrics data, the metric store reader may stream 1508 the requisite metrics data to the customer in order to fulfill the query. If the replay process includes generating data objects comprising updated metrics data, the metrics data provided to the customer may include data generated using prior versions of the algorithms used to calculate the data or may include errors. Thus, the metric store reader may be configured to additionally provide the customer with information regarding the replay process and any issues affecting this data. This may serve to notify the customer to submit a query at a later time for updated metrics data. Alternatively, if the query does not involve metrics data affected by the replay process, the metric store reader may stream the requisite metrics data without any sort of notification regarding the replay process since the metrics data may still be valid.

At a later time, the computing resource service provider may complete 1510 the replay process. As noted above, the map reduce processor may be configured to refer to a prior version of the index in order to process newly unprocessed observation journals and generate new data objects and a new version of the index. This new version of the index may refer to these new data objects while omitting any reference to previously generated data objects that may have been created subsequent to the prior version of the index used in the replay process.

Additionally, the computing resource service provider may modify the index pointer to eliminate any obsolete versions of the index. This may include the removal of any indices that were previously generated subsequent to the prior version of the index used in the replay process. Accordingly, the computing resource service provider may update 1512 the index pointer such that the metric store reader and the map reduce processor refer to the new version of the index. Any reference to data objects previously generated using indexes subsequent to the prior version of the index may be purged and thus may not be used by either the map reduce processor or the metric store reader.

As a result of this update, the metric store reader may be configured to process 1514 any future customer queries by using this new version of the index. As noted above, metrics data may have been made available to the customer while in the midst of a replay process. Thus, any metrics data provided to the customer during this time may have included data calculated using prior algorithms or erroneous (e.g., corrupted or defective) data. However, as noted above, the metric store reader may have been configured to transmit additional notifications to the customer regarding the update process. Thus, a customer may now submit a query to obtain updated metrics data. It should be noted that the metric store reader may receive customer queries asynchronously and at any time after the completion of the replay process. Alternatively, the metric store reader may not receive any queries at all.

Figure 16:
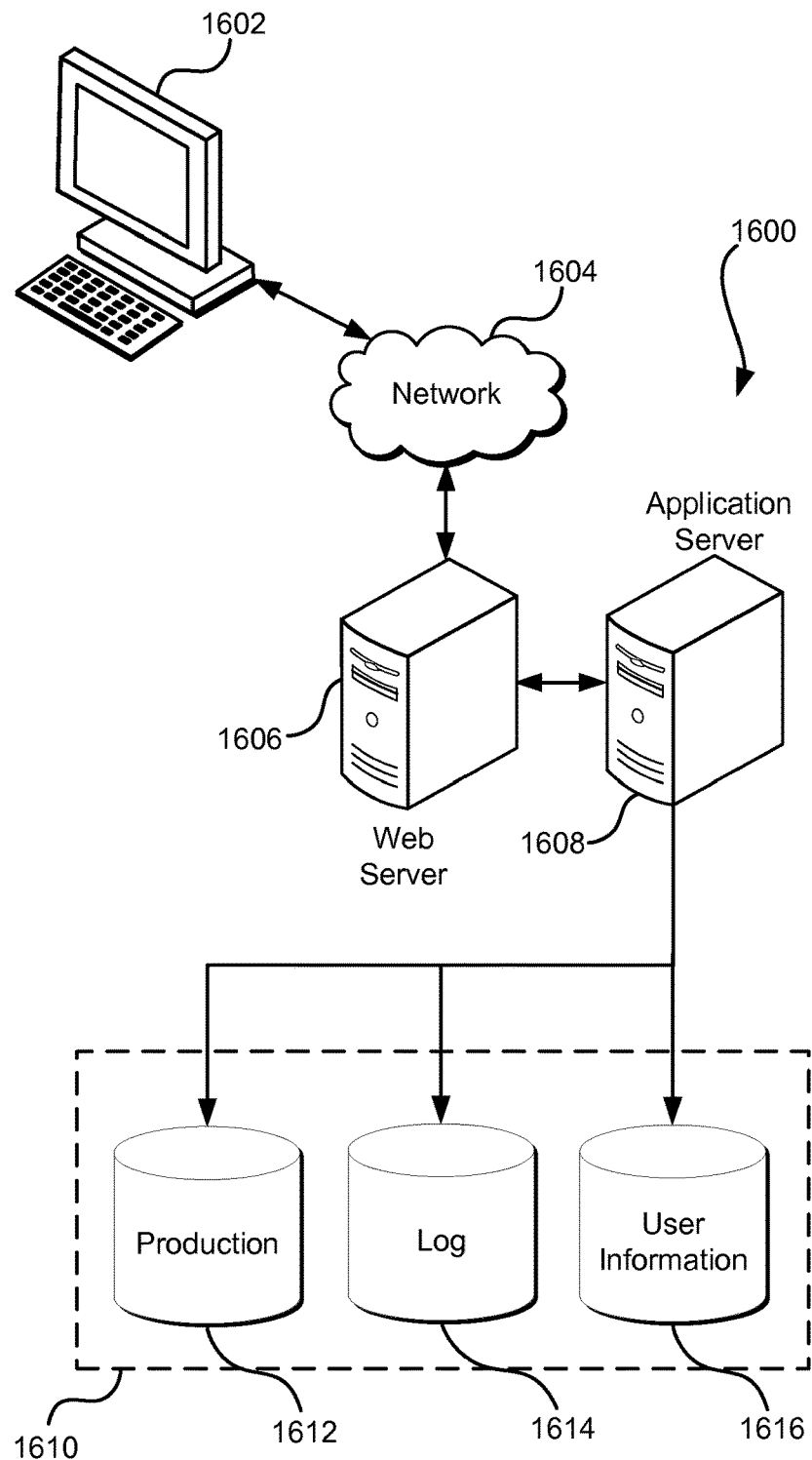
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a datastore 1610. It should be understood that there can be several application servers, layers or other elements, processes or components, which may be chained or otherwise configured, which can interact to perform tasks such as obtaining data from an appropriate datastore. Servers, as used herein, may be implemented in various ways, such as hardware devices or virtual computer systems. In some contexts, servers may refer to a programming module being executed on a computer system. As used herein the term "datastore" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the datastore as needed to execute aspects of one or more applications for the client device, handling some (even a majority) of the data access and business logic for an application. The application server may provide access control services in cooperation with the datastore and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The datastore 1610 can include several separate data tables, databases or other data storage mechanisms and media for storing data relating to a particular aspect of the present disclosure. For example, the datastore illustrated may include mechanisms for storing production data 1612 and user information 1616, which can be used to serve content for the production side. The datastore also is shown to include a mechanism for storing log data 1614, which can be used for reporting, analysis or other such purposes. It should be understood that there can be many other aspects that may need to be stored in the datastore, such as page image information and access rights information, which can be stored in any of the above listed mechanisms as appropriate or in additional mechanisms in the datastore 1610. The datastore 1610 is operable, through logic associated therewith, to receive instructions from the application server 1608 and obtain, update or otherwise process data in response thereto. In one example, a user, through a device operated by the user, might submit a search request for a certain type of item. In this case, the datastore might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    using a map reduce process for:
        aggregating observation data associated with a plurality of resources that are generating resource metrics of a plurality of observation types over a period of time, the observation data being aggregated based at least in part on a corresponding subset of the resource metrics having a common type of the plurality of observation types;
        generating a plurality of data segments from the observation data, each data segment of the plurality of data segments corresponding to a different time interval of the period time to which a subset of the observation data corresponds;
        identifying an original index corresponding to the type, the original index comprising a manifest indicating a first set of data objects associated with the type; and
        processing the manifest and the plurality of data segments to generate a second set of data objects comprising a subset of the first set of data objects, the plurality of data segments, and a new index including references to the second set of data objects;
    storing the second set of data objects;
    updating the original index by appending at least a portion of the new index; and
    replaying the map reduce process using the original index to mitigate corrupted or defective metrics data associated with the observation data.

2. The computer-implemented method of claim 1, wherein processing the manifest and the plurality of data segments further includes arranging corresponding observation data associated with the plurality of data segments based at least in part on the resource metrics.

3. The computer-implemented method of claim 1, further comprising processing a query for one or more observations associated with the resource metrics based at least in part on a portion of the updated index prior to appending the portion of the new index.

4. The computer-implemented method of claim 3, wherein processing the query is performed using only the appended portion of the new index.

5. The computer-implemented method of claim 1, further comprising detecting one or more issues with the observation data, the observation data having been processed to generate a third set of data objects prior to aggregating the observation data.

6. The computer-implemented method of claim 1, wherein the resource metrics include observations obtained from one or more computing resources provided by a computing resource service provider to one or more customers of the computing resource service provider and includes at least processor allocation, memory allocation or network performance.

7. The computer-implemented method of claim 1, wherein the index, prior to appending the new index, includes one or more index partitions, each index partition of the one or more index partitions including a database file comprising data storage locations for at least a portion of the resource metrics.

8. A computing resource monitoring system, comprising:
    memory that includes executable instructions; and one or more processors, the one or more processors that, when executing the executable instructions, at least:
        use a map reduce process that:
            aggregates observation data associated with a plurality of resources that are generating resource metrics of a plurality of observation types over a period of time, the observation data being aggregated based at least in part on a corresponding subset of the resource metrics having a common type of the plurality of observation types;
            generates a plurality of data segments from the observation data, each data segment of the plurality of data segments corresponding to a different time interval of the period time to which a subset of the observation data corresponds;
            identifies an original index corresponding to the type, the original index comprising a manifest indicating a first set of data objects associated with the type; and
            processes the manifest and the plurality of data segments to generate a second set of data objects comprising a subset of the first set of data objects, the plurality of data segments, and a new index including references to the second set of data objects;
        stores the second set of data objects;
        updates the original index by appending at least a portion of the new index; and replays the map reduce process using the original index to mitigate corrupted or defective metrics data associated with the observation data.

9. The computing resource monitoring system of claim 8, wherein the instructions that, when executed by the one or more processors, process the manifest and the plurality data segments further cause the one or more processors to arrange corresponding observation data associated with the plurality of data segments based at least in part on the resource metrics.

10. The computing resource monitoring system of claim 8, wherein the instructions, when executed by the one or more processors, further cause the one or more processors to process a query for one or more observations associated with the resource metrics based at least in part on a portion of the updated index prior to appending the portion of the new index.

11. The computing resource monitoring system of claim 10, wherein the instructions that, when executed by the one or more processors, process the query further cause the one or more processors to perform the query using only the appended portion of the new index.

12. The computing resource monitoring system of claim 8, wherein the instructions, when executed by the one or more processors, further cause the one or more processors to detect one or more issues with the observation data, the observation data having been processed to generate a third set of data objects prior to aggregating the observation data.

13. The computing resource monitoring system of claim 8, wherein the resource metrics include observations obtained from one or more computing resources provided by a computing resource service provider to one or more customers of the computing resource service provider and includes at least processor allocation, memory allocation or network performance.

14. The computing resource monitoring system of claim 8, wherein the index, prior to appending the new index, includes one or more index partitions, each index partition of the one or more index partitions including a database file comprising data storage locations for at least a portion of the resource metrics.

15. One or more non-transitory computer-readable storage media having collectively stored therein instructions that, if executed by one or more processors of a computing resource monitoring system, cause the computing resource monitoring system to:
use a map reduce process to:
aggregate observation data associated with a plurality of resources that are generating resource metrics of a plurality of observation types over a period of time, the observation data being aggregated based at least in part on a corresponding subset of the resource metrics having a common type of the plurality of observation types;
generate a plurality of data segments from the observation data, each data segment of the plurality of data segments corresponding to a different time interval of the period time to which a subset of the observation data corresponds;
identify an original index corresponding to the type, the original index comprising a manifest indicating a first set of data objects associated with the type; and
process the manifest and the plurality of data segments to generate a second set of data objects comprising a subset of the first set of data objects, the plurality of data segments, and a new index including references to the second set of data objects;
store the second set of data objects;
update the original index by appending at least a portion of the new index; and
replay the map reduce process using the original index to mitigate corrupted or defective metrics data associated with the observation data.

16. The one or more non-transitory computer-readable storage media of claim 15, wherein the instructions that, when executed by the one or more processors, process the manifest and the plurality data segments further causes the one or more processors to arrange corresponding observation data associated with the plurality of data segments based at least in part on the resource metrics.

17. The one or more non-transitory computer-readable storage media of claim 15, wherein the instructions, when executed by the one or more processors, further cause the computing resource monitoring system to process a query for one or more observations associated with the resource metrics based at least in part on a portion of the updated index prior to appending the portion of the new index.

18. The one or more non-transitory computer-readable storage media of claim 17, wherein the instructions, when executed by the one or more processors, further cause the computing resource monitoring system to process the query further perform the query using only the appended portion of the new index.

19. The one or more non-transitory computer-readable storage media of claim 15, wherein the instructions that, when executed by the one or more processors, further cause the computing resource monitoring system to detect one or more issues with the observation data, the observation data having been processed to generate a third set of data objects prior to aggregating the observation data.

20. The one or more non-transitory computer-readable storage media of claim 15, wherein the resource metrics include observations obtained from one or more computing resources provided by a computing resource service provider to one or more customers of the computing resource service provider and includes at least processor allocation, memory allocation or network performance.

21. The one or more non-transitory computer-readable storage media of claim 15, wherein the index, prior to appending the new index, includes one or more index partitions, each index partition of the one or more index partitions including a database file comprising data storage locations for at least a portion of the resource metrics.

* * * * *